United States Patent
Kusam et al.

(10) Patent No.: US 10,257,080 B1
(45) Date of Patent: Apr. 9, 2019

(54) HARDWARE RESOURCE ALLOCATION FOR EQUAL-COST MULTI-PATH GROUPS

(71) Applicant: Amazon Technologies, Inc., Seattle, WA (US)

(72) Inventors: Sravya Kusam, Austin, TX (US); Bijendra Singh, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 252 days.

(21) Appl. No.: 15/169,599

(22) Filed: May 31, 2016

(51) Int. Cl.
| | | |
|---|---|---|
| *H04L 12/707* | (2013.01) | |
| *H04L 12/773* | (2013.01) | |
| *H04L 29/06* | (2006.01) | |
| *H04L 12/935* | (2013.01) | |
| *H04L 12/721* | (2013.01) | |

(52) U.S. Cl.
CPC .............. *H04L 45/24* (2013.01); *H04L 45/12* (2013.01); *H04L 45/14* (2013.01); *H04L 45/60* (2013.01); *H04L 49/30* (2013.01); *H04L 67/42* (2013.01)

(58) Field of Classification Search
CPC . H04L 41/08; H04L 41/0803; H04L 41/0806; H04L 41/0813; H04L 45/12; H04L 45/14; H04L 45/22; H04L 45/24; H04L 45/245; H04L 45/60; H04L 49/25; H04L 49/258; H04L 49/30
See application file for complete search history.

(56) References Cited

U.S. PATENT DOCUMENTS

| | | | | |
|---|---|---|---|---|
| 6,532,229 | B1 * | 3/2003 | Johnson | H04L 45/00 370/238 |
| 7,190,696 | B1 * | 3/2007 | Manur | H04L 45/00 370/392 |
| 8,982,700 | B1 * | 3/2015 | Zhou | H04L 45/125 370/229 |
| 9,281,953 | B1 * | 3/2016 | Dropps | H04L 12/185 |
| 9,479,437 | B1 * | 10/2016 | Zhou | H04L 45/24 |
| 9,647,882 | B1 * | 5/2017 | Whittaker | H04L 41/08 |
| 9,853,900 | B1 * | 12/2017 | Mula | H04L 47/125 |
| 2002/0018477 | A1 * | 2/2002 | Katz | H04L 12/40065 370/401 |
| 2007/0253446 | A1 * | 11/2007 | Wilson | H04L 45/00 370/473 |

(Continued)

*Primary Examiner* — Vivek Srivastava
*Assistant Examiner* — William C McBeth
(74) *Attorney, Agent, or Firm* — Kilpatrick Townsend & Stockton LLP

(57) ABSTRACT

Techniques are provided for allocating hardware resources for an equal-cost multi-path (ECMP) group based on information about the network architecture. A table in memory may include a plurality of entries. Each entry may include interface set and a number of interfaces. Each interface set may represent a list of interfaces for the network device for a given network connection. The network device may receive a list of interfaces for allocating resource for an EMCP group. The network device may select an entry from the table by identifying an interface set that includes all of the interfaces for the ECMP group. The network device may determine a size of the ECMP group using a number of interfaces for the identified interface set from the entry from the table and allocate hardware resources (e.g., memory) for the ECMP group based on the determined size of the ECMP group.

20 Claims, 19 Drawing Sheets

(56) References Cited

U.S. PATENT DOCUMENTS

| | | | |
|---|---|---|---|
| 2009/0190580 A1* | 7/2009 | Kailasam | H04L 45/00 370/389 |
| 2012/0176904 A1* | 7/2012 | Gray | H04L 45/16 370/238 |
| 2012/0179800 A1* | 7/2012 | Allan | H04L 45/245 709/223 |
| 2014/0241147 A1* | 8/2014 | Rajagopalan | H04L 45/245 370/221 |
| 2014/0241361 A1* | 8/2014 | Bosshart | H04L 45/74 370/392 |
| 2016/0164734 A1* | 6/2016 | Durgin | H04L 41/0836 370/389 |
| 2016/0216913 A1* | 7/2016 | Bosshart | G06F 3/0631 |
| 2018/0048591 A1* | 2/2018 | Sellappa | H04L 49/254 |

* cited by examiner

HARDWARE RESOURCE ALLOCATION FOR EQUAL-COST MULTI-PATH GROUPS

BACKGROUND

A network device, such as a router or a switch in a network system receives packets from a number of ingress ports and forwards the packets to a number of egress ports. The network device determines the egress port to forward data packets to, dependent on the destination address included in the data packets. Typically, the source of the packet may be connected to a network device, which in turn may be connected to a number of other network devices for forwarding data packets to a network device connected to a destination. The source may be a client or a server. Similarly, the destination may be a server or a client, or vice versa. In certain implementations, several parallel paths may exist between the source and the destination.

BRIEF DESCRIPTION OF THE DRAWINGS

Various embodiments in accordance with the present disclosure will be described with reference to the drawings, in which:

FIG. 14 illustrates an array of bit vectors each presenting one of a plurality of ECMP groups according to one embodiment;

DETAILED DESCRIPTION

Figure 1:
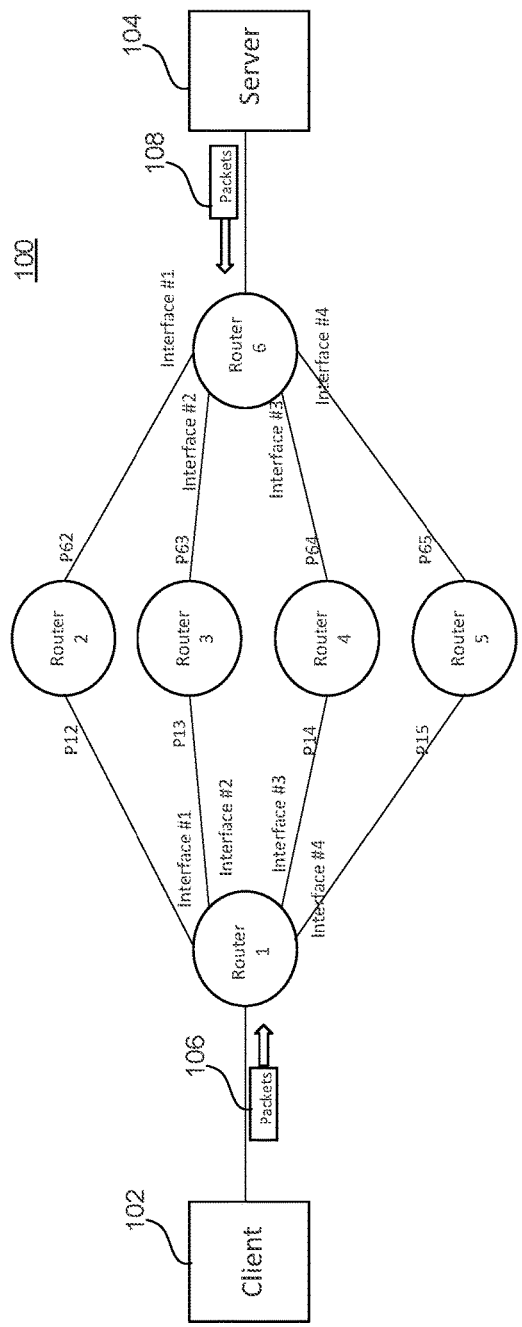
FIG. 1 illustrates an example of equal-cost multi-path (ECMP) interfaces for packets between a client and a server.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

A network device, such as a router or a switch, in a network system receives packets from a number of ingress ports and forwards the packets to a number of egress ports. The network device determines the egress port to forward data packets to dependent on the destination address included in the packets. In certain instances, several paths may exist for forwarding the packets from the network device to another device or group of devices. In such instances, to improve or optimize the routing of the packets, the network device may form multi-path groups that include the interfaces connected to these multiple paths. In certain implementations, for example in networks, the multiple paths for forwarding the packets from the network device to the destination or intermediary node to the destination may result in same or almost same latency and may be considered equal cost with respect to each other. In such implementations, the multi-path groups may be referred to as equal-cost multi-path groups or ECMP groups.

A network device in a network may support several ECMP groups. For example, a network device in a data center or cloud environment may support several tens of thousands ECMP groups. Traditionally, network devices implement a pool of hardware resource groups to accommodate each of these ECMP groups. A hardware resource group may be a memory block or a memory space in a memory device or storage unit, such as random access memory (RAM), static RAM, flash memory, and the like. A link or path can be defined as a "route" between two network devices (e.g., routers) in a network. Each hardware resource group is designed to accommodate an ECMP group comprising a limited set of fixed number of interfaces (e.g., 16, 24, 48, etc.). For example, one hardware resource group may be a hardware configuration (e.g., memory) that can accommodate 16 interfaces, whereas another hardware resource group may be a hardware configuration that can accommodate 32 interfaces.

However, the network is dynamic in nature, and the number of interfaces assigned to an ECMP group may change as the network device is in operation transmitting and receiving network packets. For example, using the Open Shortest Path First (OSPF) protocol, the network device may discover new paths between the network device and the destination, that may result in identifying new interfaces to the ECMP group. As more interfaces are identified to the ECMP group, in certain instances, the current hardware resource group may not be able to continue to accommodate the ECMP group. In such instances, the ECMP group is transferred to a hardware resource group that can support a larger number of interfaces. Such transfer of the ECMP group from one hardware resource group to another hardware resource group can be an expensive operation, in terms of network latency and processing resources, and reduces the overall performance of the network device.

In certain embodiments, techniques are described for selecting improved or optimal hardware resources for an ECMP group, so that transferring the ECMP group from one hardware resource group to another is minimized. The size of the hardware resource group may be selected based on information associated with the network architecture of the network that the network device operates in. For example, in certain embodiments, the network device can discover the maximum number of interfaces from the network device for equal-cost multi-paths between a network device and another device or a group of other devices. The network device can use this information in selecting the hardware resource group that can accommodate the maximum number of interfaces. Therefore, as interfaces are identified for an ECMP group the hardware resource group is able to continue to accommodate the interfaces without having to transfer to another hardware resource group, and reducing the number of moves or transfers for the multi-path groups results in improved performance of the network device.

For illustrative purposes, aspects of the disclosure discuss ECMP groups, however, similar techniques may be used for any other implementations of multi-path groups, such as variations and improvements with respect to protocols and techniques associated with ECMP groups and/or other multi-path grouping techniques, without deviating from the scope of the disclosure. For example, variations and improvements associated with the ECMP groups, such as weighted cost multi-path groups, may use techniques described herein, without deviating from the scope of the disclosure.

FIG. 1 illustrates an example of ECMP interfaces for packets being transmitted between a client 102 and a server 104. FIG. 1 illustrates a network 100 comprising a client 102, a server 104 and a number of network devices, such as routers (Router 1, Router 2, Router 3, Router 4, Router 5, and Router 6), connecting the client and server. Although FIG. 1 illustrates a client and a server as end points, the end points may be servers, clients, or other intermediary network devices. As shown in FIG. 1, the client 102 transmits packets 106 destined for the server 104 to Router 1. As illustrated in FIG. 1, Router 1 has four distinct but equal-cost paths for the packet 106 going to the server. Each equal-cost path is connected to Router 1 through an interface or port (interface #1, interface #2, interface #3 and interface #4) on Router 1. The first path traverses through Router 2 and communication links P12 and P62. The second path traverses through Router 3 and communication links P13 and P63. The third path traverses through Router 4 and communication links P14 and P64. The fourth path traverses through Router 5 and communication links P15 and P65.

Similarly, packets 108 originating from server 104 and destined for client 102 are sent by the server 104 to Router 6. Router 6 can also send packets 108 over four distinct but equal-cost paths to the client 102. Each equal-cost path is connected to Router 6 through an interface or port (interface #1, interface #2, interface #3 and interface #4) on Router 6. Similar to the paths discussed with reference to packets 106, the packets 108 may be sent over paths P62-Router 2-P12, P63-Router 3-P13, P64-Router 4-P14 or P65-Router 5-P15.

Figure 2:
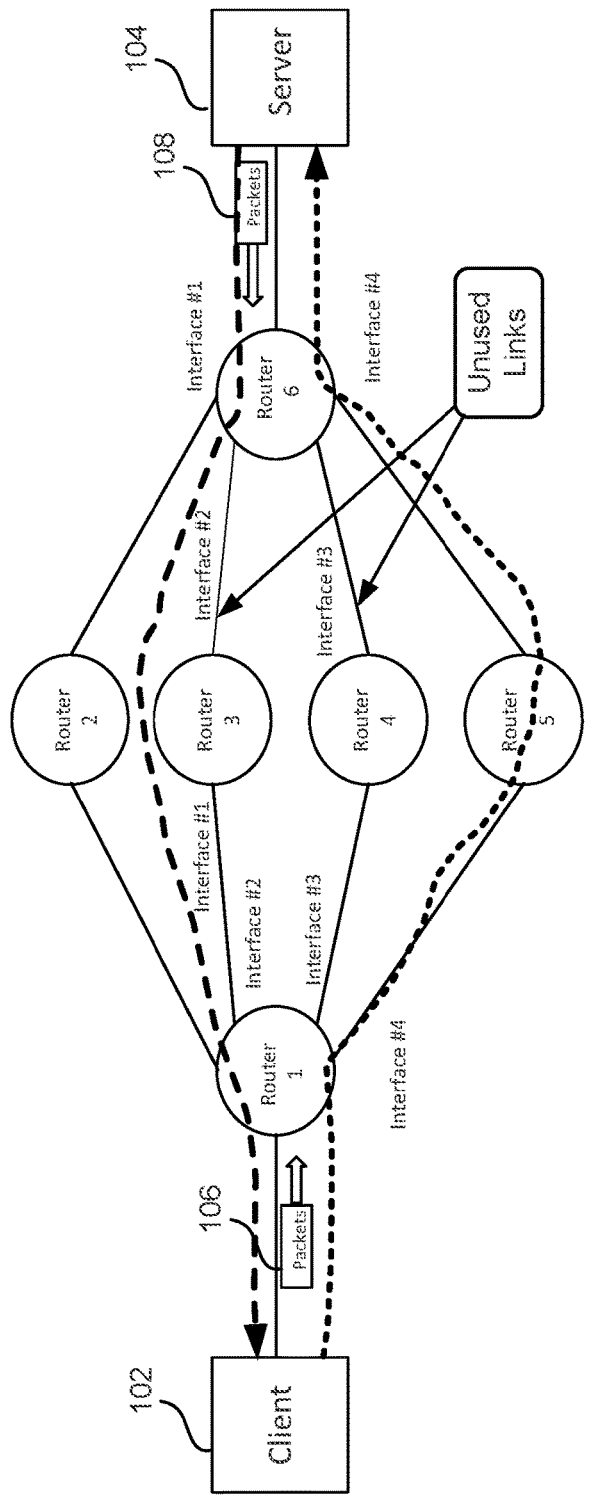
FIG. 2 illustrates routing of data packets that may use one of a plurality of available ECMP interfaces shown in FIG. 1.

FIG. 2 illustrates routing of packets through one of the many paths available. FIG. 2 illustrates that packets 106 from Router 1 traverse communication link P12, Router 2 and communication link P62 before reaching Router 6. Router 6 routes the packets to the server 104. Similarly, packets 108 from Router 6 traverse communication link P65, Router 5 and communication link P15 before reaching Router 1. Router 1 routes the packets 108 to the client 102. Therefore, in instances where equal-cost multiple paths may be available, the network device may select the best path out of the equal-cost multiple paths. In circumstances where multiple equally good paths are available, then only one of the paths is used and the rest are left unused. The unused paths result in wasted network capacity.

Figure 3:
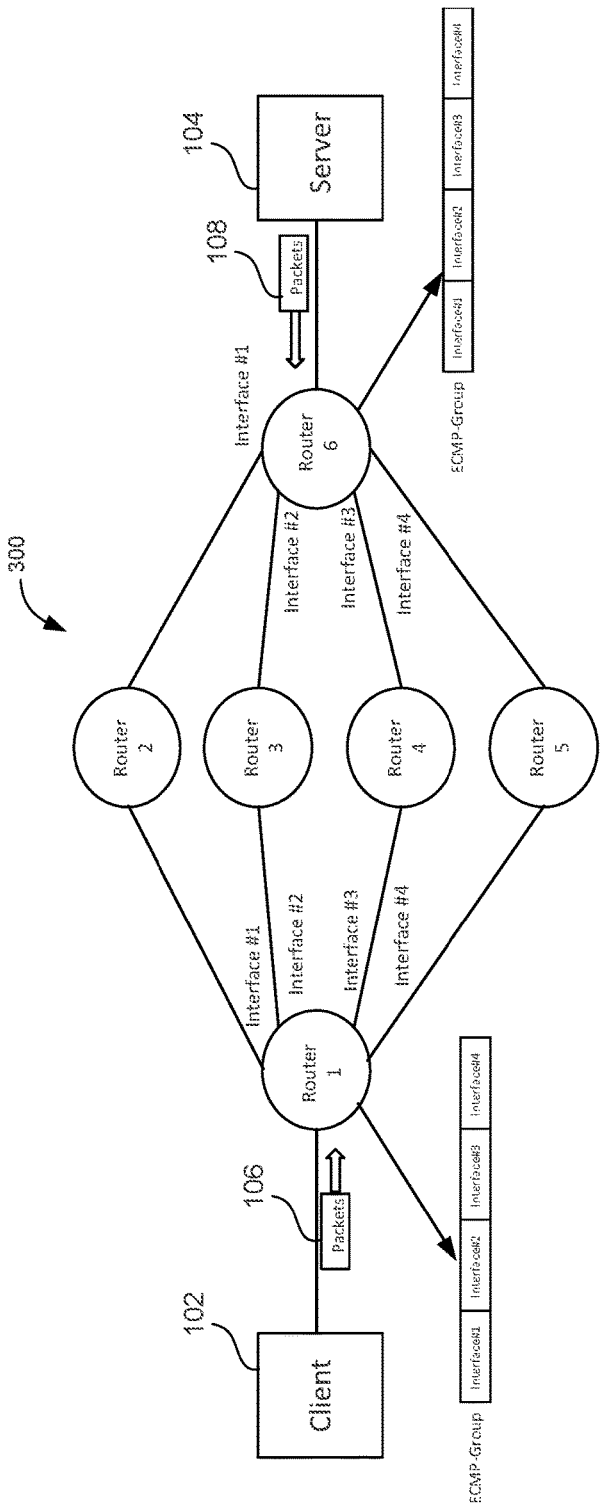
FIG. 3 illustrates routing of data packets that may use all available ECMP interfaces between a client and a server shown in FIG. 1, in accordance with some embodiments.

FIG. 3 illustrates an example multi-path group implementation. Specifically, FIG. 3 illustrates a multi-path group, such as an ECMP group 300 including references to interfaces that connect Router 1 to Router 6, such as interface #1 connecting Router 1 to Router 2, interface #2 connecting Router 1 to Router 3, interface #3 connecting Router 1 to Router 4, and interface #4 connecting Router 1 to Router 5. In FIG. 3, the routing protocols of FIG. 2 have been enhanced to consider all available equal cost paths. As illustrated in FIG. 3, when multiple equally good paths are available, in certain embodiments, they are grouped together in an ECMP group (e.g., ECMP group 300) for a route. A route may refer to the path to a destination for a network packet (e.g., using destination IP address). The network device may use a load balancing algorithm to distribute the traffic flow across all interfaces that are part of the ECMP group. ECMP groups are typically maintained to load balance and to provide redundant paths to ensure high reliability for network connectivity.

Referring to FIG. 3, packets 106 sent by client 102 (a source device) are received by Router 1 that forwards the received packets across the ECMP group 300 comprising four equal cost paths to one of the respective routers—Router 2, Router 3, Router 4, and Router 5, which are connected to Router 6. As shown in FIG. 3, each path from Router 1 connecting to another router has an associated interface to the respective path from Router 1—interface #1, interface #2, interface #3, and interface #4. The respective interface out of the plurality of interfaces for an ECMP group may be selected using various known hashing techniques, load balancing techniques and flow considerations. Therefore, network traffic (i.e., several packets) originating from the client 102 and destined for the server 104 (a destination device) may be forwarded from Router 1 using different interfaces belonging to the ECMP group, resulting in better utilization of the network bandwidth. Conversely, packets 108 sent by server 104 are received by Router 6. Router 6 forwards the packets 108 using the ECMP group 300 through one of the interfaces #1-4 to respective Routers 2-5, which are connected to Router 1. Router 1 forwards the received packets 108 from Routers 2-5 and forwards the packets 108 to the client 102.

In general, data-center networks are designed for extremely high availability and resiliency, so that a large number of equal cost multi-paths are employed. The equal-cost multi-paths are grouped together to form a multitude of ECMP groups according to their applications. The ECMP groups may have different sizes (i.e., number of interfaces) for different types of applications and services.

In certain embodiments, the network device is employed in a data center or a cloud computing center. The data center network may include a multitude of network connections each having a large number of equal-cost multi-paths connected in parallel. The equal-cost multi-paths are grouped into various sized ECMP groups. In some embodiments, a router in a data center may have different sized ECMP groups to connect to different bricks (e.g., north, south, east, west) that can be grouped in various clusters). For illustration purposes, groupings disclosed herein have been described using directional notations (e.g., north, south, east, west), however, any other notational scheme for referring to groupings may be employed without deviating from the scope of the disclosure. As used herein, the term "brick" may broadly refer to a processing domain comprising a plurality of network devices and/or computer devices. In certain implementations, a brick may be implemented as a network fabric comprising a plurality of network devices that connect a plurality of physical and/or virtual hosts to each other. In certain instances, a brick may aggregate ingress traffic received from multiple devices (interfaces) and send it to a next layer of the network stack for processing. In certain instances, a brick may also be referred to as a spine, spline, or leaf, without deviating from the scope of the disclosure.

Figure 4:
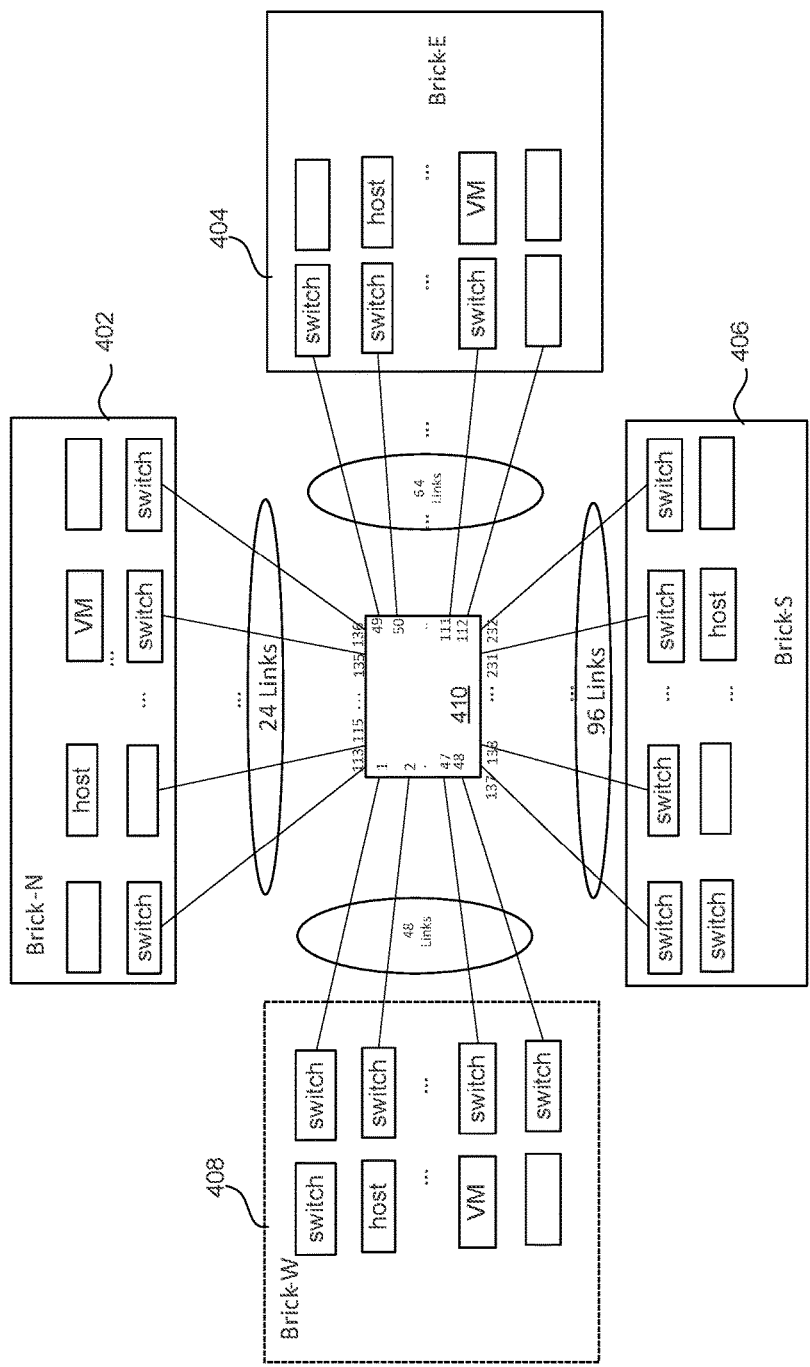
FIG. 4 illustrates a network device for distributing data packets between multiple bricks across a network system according to some embodiments.

FIG. 4 illustrates a network device for distributing packets between multiple bricks across a network according to certain embodiments. FIG. 4 shows an example network device 410, such as a router or a switch, including 24 communication links to a Brick-N 402, 64 links to a Brick-E 404, 96 links to a Brick-S 406, and 48 links to a Brick-W 408. It is understood that the number of communication links and interfaces to those communication links, between Router 410 and the bricks can be any integer number N. In the example shown in FIGS. 4, 24, 64, 96, and 48 links are used to connect to the respective Brick-N, Brick-E, Brick-S, and Brick-W. But it is understood that the number of links are arbitrarily chosen for describing the example embodiment and should not be limiting.

Each brick represents a processing domain that may include several switches, where each switch connected to the network device 410 through a link. For example, the network device 410 includes 48 egress interfaces numbered 1 to 48 connecting to Brick-W, 64 egress interfaces numbered 49 to 112 connecting to Brick-E, 24 egress interfaces numbered 113 to 136 connecting to Brick-N and 96 egress interfaces numbered 137 to 232 connecting to Brick-S. As used herein, an interface is used for sending or receiving data packets over a communication link in a network. In certain embodiments, the communication links numbered from 1 to 232 may have the same cost, i.e., same or similar latency for transmission of packets from the network device to the bricks 402, 404, 406, and 408. In certain embodiments, network paths may be designed with similar or equal costs by conforming the communication links and interfaces to provide similar physical characteristics (length, bandwidth, transmission data rate, and the like).

In certain environments, a network device is required to create ECMP groups of different sizes. In such instances, the configuration software for the network device cannot provide information about the final size of an ECMP group, since interfaces may be dynamically added or removed to the ECMP group over time. As new routes are created, for each route the router may have one or a few interfaces as its next-hop interface to create an ECMP group. However, interfaces are dynamically added to and/or removed from an ECMP group at run time. Embodiments of the present disclosure provide approaches to efficiently allocate hardware resources to ECMP groups.

Figure 5:
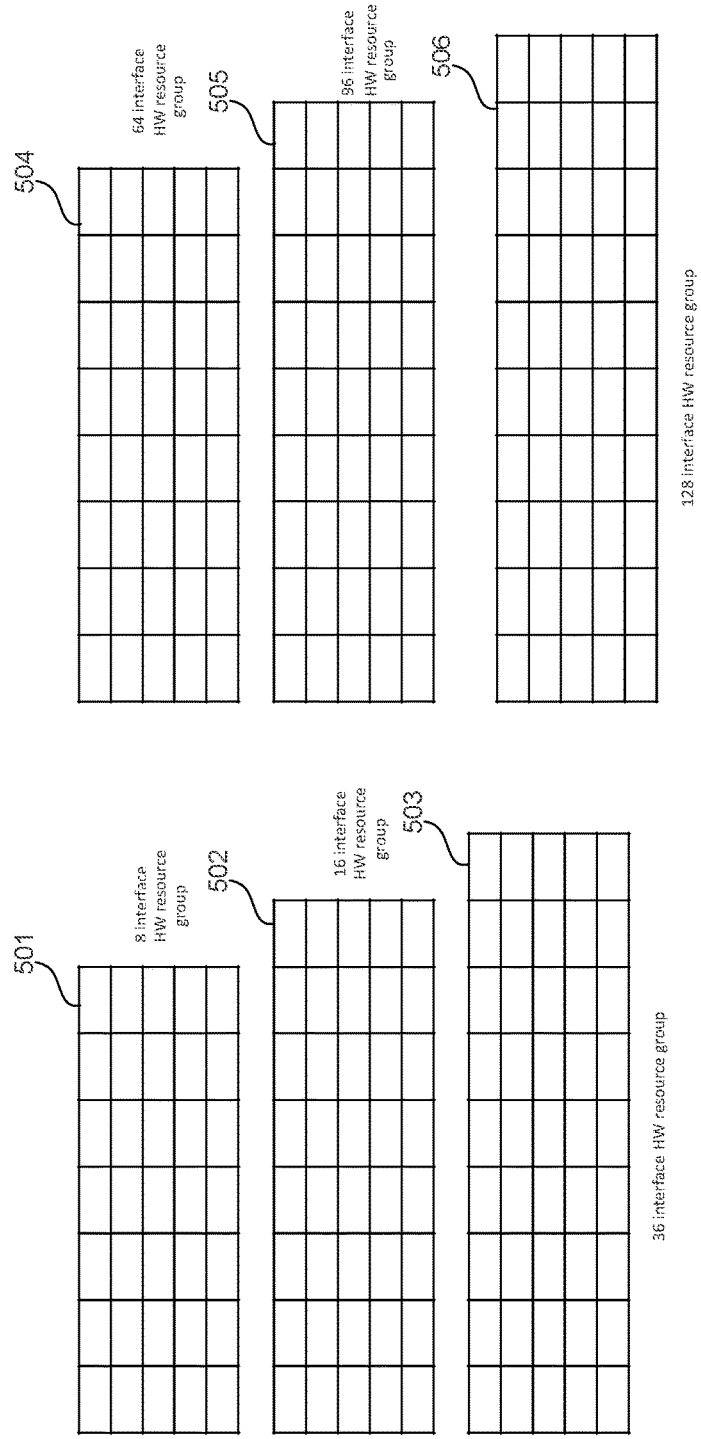
FIG. 5 illustrates an example of hardware resource groups configured to create ECMP groups according to some embodiments.

FIG. 5 shows an example hardware design for a pool of next-hop group or hardware resource group, according to one embodiment. In certain embodiments, network device hardware is designed in groups of fixed sizes so that they can be flexibly partitioned into a number N1 of groups of size S1, a number N2 of groups of size S2, and so forth for different deployment scenarios. For scalability, the group sizes may be of specific values rather than all possible values. As shown in FIG. 5, an example pool of 6 next-hop groups or hardware resource groups includes a first group 501 having 8 interfaces, a second group 502 having 16 interfaces, a third group 503 having 36 interfaces, a fourth group 504 having 64 interfaces, a fifth group having 96 interfaces, and a sixth group having 128 interfaces. In the example shown in FIG. 5, the pool of hardware resources groups has 6 next-hop groups or hardware resource groups, but it is understood that the number of the hardware resource groups and the associated number of interfaces are arbitrarily chose for describing the example embodiment and should not be limiting.

The management module of the network device may generate ECMP groups and assigns hardware resource groups to the ECMP groups based on the number of interfaces in the ECMP group. For example, in an example setting a network device at start-up time may generate ECMP groups for the following routes or network connections:

R1={1, 2, 3, 4, 5, 6, 7, 8, 9};
R2={10, 11};
R3={49, 50, 51};
R4={113, 120, 136}; and
R5={137, 140, 150, 160, 232}

The network device may include a management module or software configured to know that hardware resource groups (or next-hop groups) of sizes {24, 48, 64, 96} will be required to be created, thus narrowing the allocation space from all possible choices to a smaller set. The management module will be described in detail below.

However, even with the smaller set of hardware resource groups, the network device's management module or software still cannot efficiently allocate the right-sized hardware resources because the management module does not have information about the final size of the ECMP group when all interfaces have been added. In instances, where a hardware resource group with fewer resources than later needed is allocated, then the ECMP group has to be moved to a larger size hardware resource group. Such moving or transferring operation of the ECMP group from one hardware resource group to another hardware resource group is expensive and complicated as the move must be performed without affecting live traffic running through the interfaces of the ECMP group. This forces the move of the ECMP group from one hardware resource group to another hardware resource group to be a very well planned set of fixed steps that can be time consuming and complex.

Figure 6:
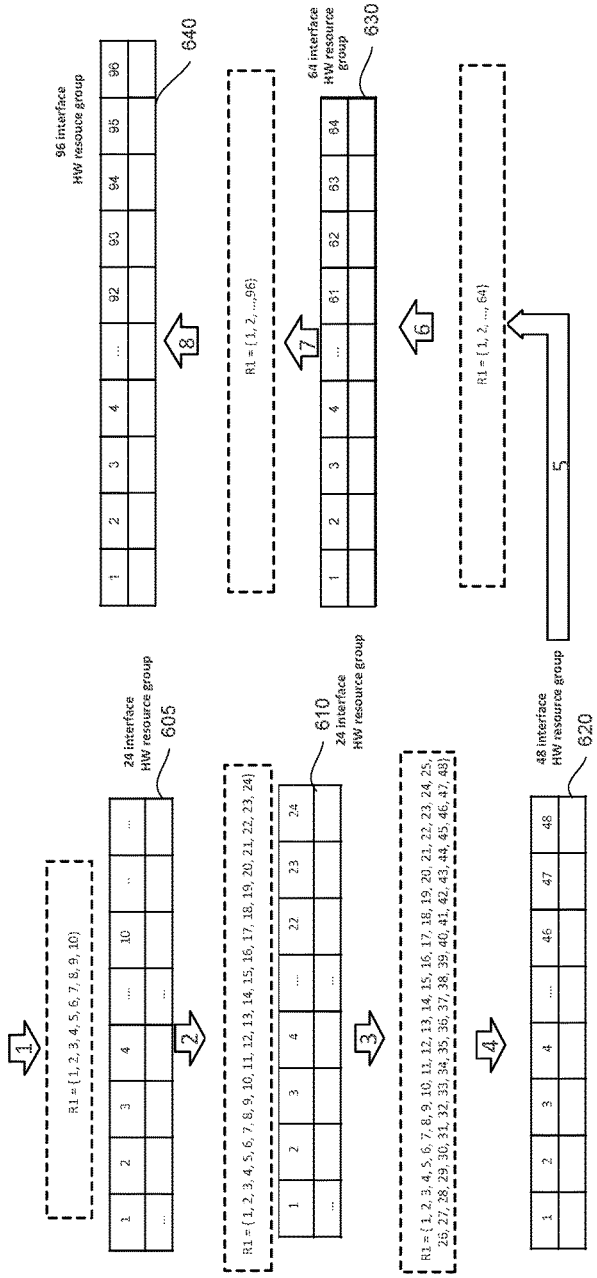
FIG. 6 illustrates an example of an ECMP group hardware resource allocation scheme.

FIG. 6 illustrates an example of an allocation scheme of hardware resource groups to an ECMP group, without consideration to the potential group of the interfaces that may eventually be assigned to the ECMP group in run-time. Such an allocation of hardware resource groups to an ECMP group may result in inefficient utilization of resources of the network device. As will be described more in detail below, changing the size of an ECMP group, without proper consideration for the dynamic nature of the interfaces associated with an ECMP group, would require changing the hardware resources (such as hardware resource group) associated with the ECMP group multiple times.

Referring to FIG. 6, a route initially has 10 next-hop interfaces R1={1, 2, 3, 4, 5, 6, 7, 8, 9, 10} (indicated by an arrow denoted "1"). The ECMP-group resource allocation module or software of the network device will allocate a first hardware resource group having 24 interfaces (block 610). Next, the routing protocol may dynamically add 14 additional interfaces (indicated by an arrow denoted "2") so that the route now contains R1={1, 2, . . . , 23, 24}). The first 24-interface hardware resource group (block 610) still accommodates these 14 additional interfaces. However, when the routing protocol further dynamically adds additional interfaces 25 to 48 (indicated by an arrow denoted "3" and block 620) as next-hops for this route, the route now contains R1={1, 2, . . . , 47, 48}. This forces the group to move to a next large-sized hardware resource group of 48 interfaces (indicated by arrow denoted "4" and block 630).

When the routing protocol needs to further dynamically add 16 additional interfaces, such as interfaces from 49 to 64 for this route, R1={1, 2, . . . , 63, 64} as indicated by an arrow denoted "5". These additional 16 interfaces force the route group to again be moved to a next large-sized hardware resource having 64 interfaces (as indicated by an arrow denoted "6" and block 640). When the routing protocol needs to further dynamically add 32 additional interfaces, such as interfaces from 65 to 96 for this route, the route now contains R1={1, 2, . . . , 95, 96} (as indicated by an arrow denoted "7" and block 650). These additional interfaces force the route group to a next large-sized hardware resource group having 96 interfaces (block 650).

Figure 7:
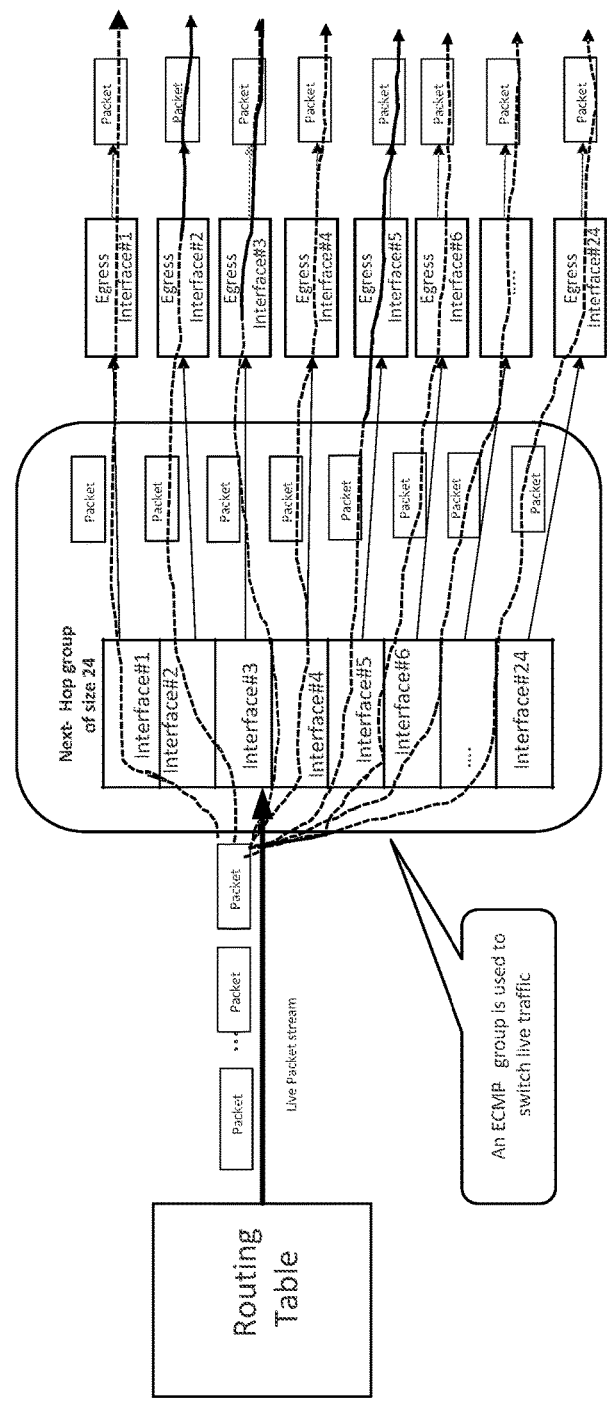
FIG. 7 illustrates an example procedure for moving an ECMP group from one group to another.

Moving packet traffic from one hardware resource group to another hardware resource group may face numerous problems. For some network communication protocols, an ECMP group is actively used to forward live traffic over its member interfaces so it cannot be simply deleted from one hardware resource group and then created somewhere else. FIG. 7 shows an example ECMP group that distributes data packets across a set of equal cost multi-path routes toward a destination. As shown in FIG. 7, a routing table is used to direct packets across the ECMP group having 24 interfaces (interfaces #1 through #24). It is important that an addition or a deletion of interfaces, and hence forcing the move of an ECMP group to another hardware resource pool, should not result in dropping of packets, nor should it result in significant re-ordering of packets within the same flow. In some communication protocols, all packets are numbered sequentially and a missing sequence number may be considered that an interface is broken. If a packet re-ordering occurs, the communication protocol may not be used for real-time or interactive communication applications.

To avoid dropping or re-ordering of packets, a fixed set of steps may be performed in a predetermined sequence when an ECMP group needs to be moved. (1) For example, the network device may create an equivalent replication of the ECMP group from the pool of hardware resource groups having a large number of interfaces. For example, if an ECMP group with 24 next-hop interfaces is being moved to a 48 hardware resource group, then the original 24 next-hop interfaces have to be kept active to uninterruptedly forward the live traffic, and a copy of the ECMP group is created in the 48 interface hardware resource group (the next large-sized ECMP group) from the pool. This may also involve generating a copy of other resources currently being used to form the entire forwarding path, which includes an intermediate table called an LPM-pointer (longest prefix match-pointer) table. The LPM-pointer table serves as a level of indirection between the routing table and the ECMP-group table. (2) The network device may automatically update the routing table to point to a new copy of the LPM-pointer table, which points to the new ECMP group at the new hardware resource pool. (3) The network device may forward the live traffic using the new ECMP-group hardware resource group. (4) The network device may release the resources of the previous ECMP group and tables associated with the previous route (path) to the hardware resource pool for future use.

As can be inferred, the entire process of moving an ECMP group from one hardware resource group to another may be very time consuming and the process may be complex. Embodiments disclosed herein provide methods, devices, and systems to minimize such moves of the ECMP group from one hardware resource group to another. Embodiments disclosed herein exploit properties and knowledge of the network architecture to improve the allocation of resources to an ECMP group. For example, in certain embodiments, the network device may automatically learn from the currently configured network architecture the size of the allocation of hardware resources for future ECMP-group creations and modifications.

Referring back to FIG. 4, the example network device 410 includes 24 links associated with the interfaces numbered 113-136 leading to the Brick-N 402 to form an ECMP group of a maximum size of 24. Using this network architecture property, when a new ECMP group is created, if it contains any of the interfaces numbered from 113 to 136, according to certain embodiments, a hardware resource group of 24 is assigned to the ECMP group. Thus, if a route initially contains only the following 5 interfaces {113, 115, 120, 121, 134}, the method according to certain embodiments of the present disclosure uses the properties of the network architecture to allocate hardware resources for 24 interfaces to create the ECMP group.

Similarly, interfaces numbered 137 to 232 leading to the Brick-S 406 are used to form an ECMP group having hardware resources to accommodate a maximum size of 96. Thus, the method exploits the knowledge about the network architecture configuration and hence allocates hardware resources of the size 96 to form an ECMP group including any interfaces in this number range. For example, if the route initially contains next-hop interfaces {140, 150, 160, 200, 232}, the allocated size for the ECMP group that contains these numbered interfaces is the configured size of the Brick-S, since these interfaces belong to the Brick-S.

Figure 8:
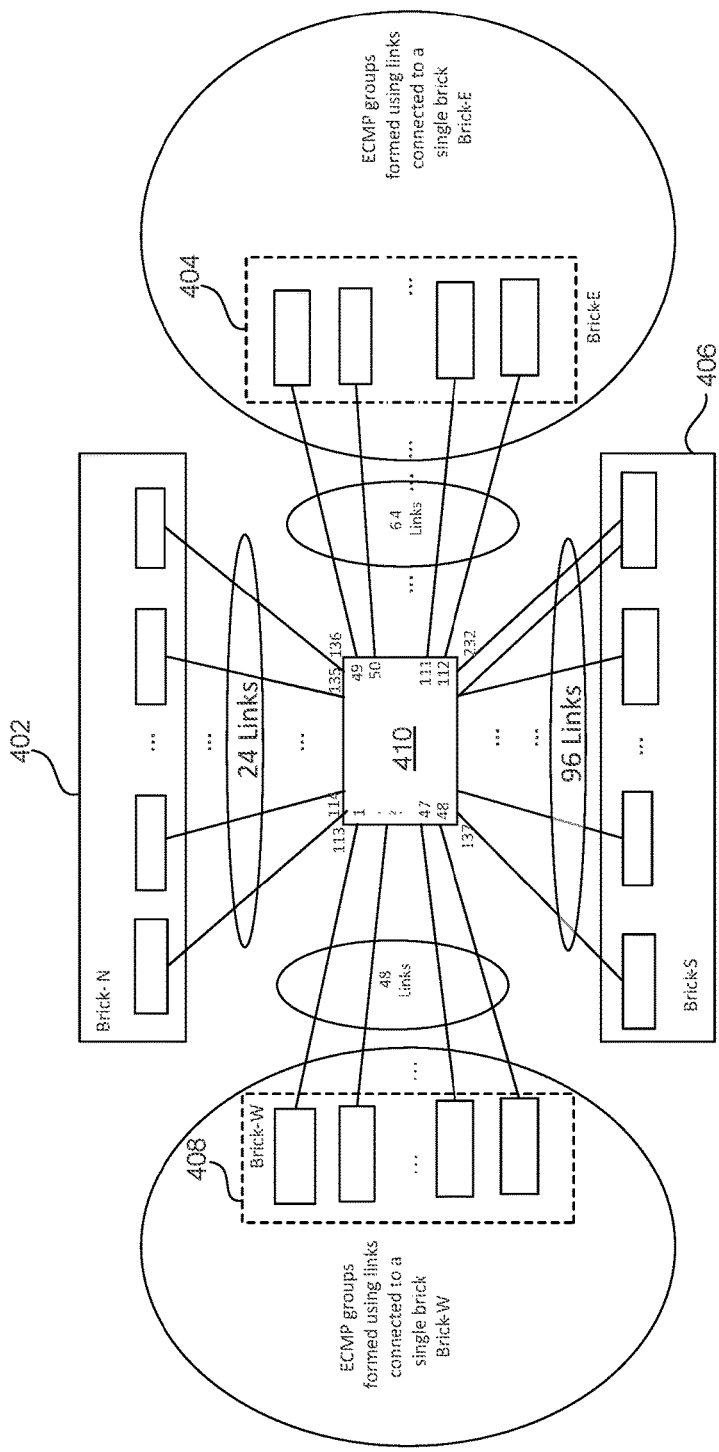
FIG. 8 is a block diagram illustrating one embodiment of allocating hardware resource for an ECMP group formed with interfaces connected to a single brick, in accordance with the present disclosure.
Figure 9:
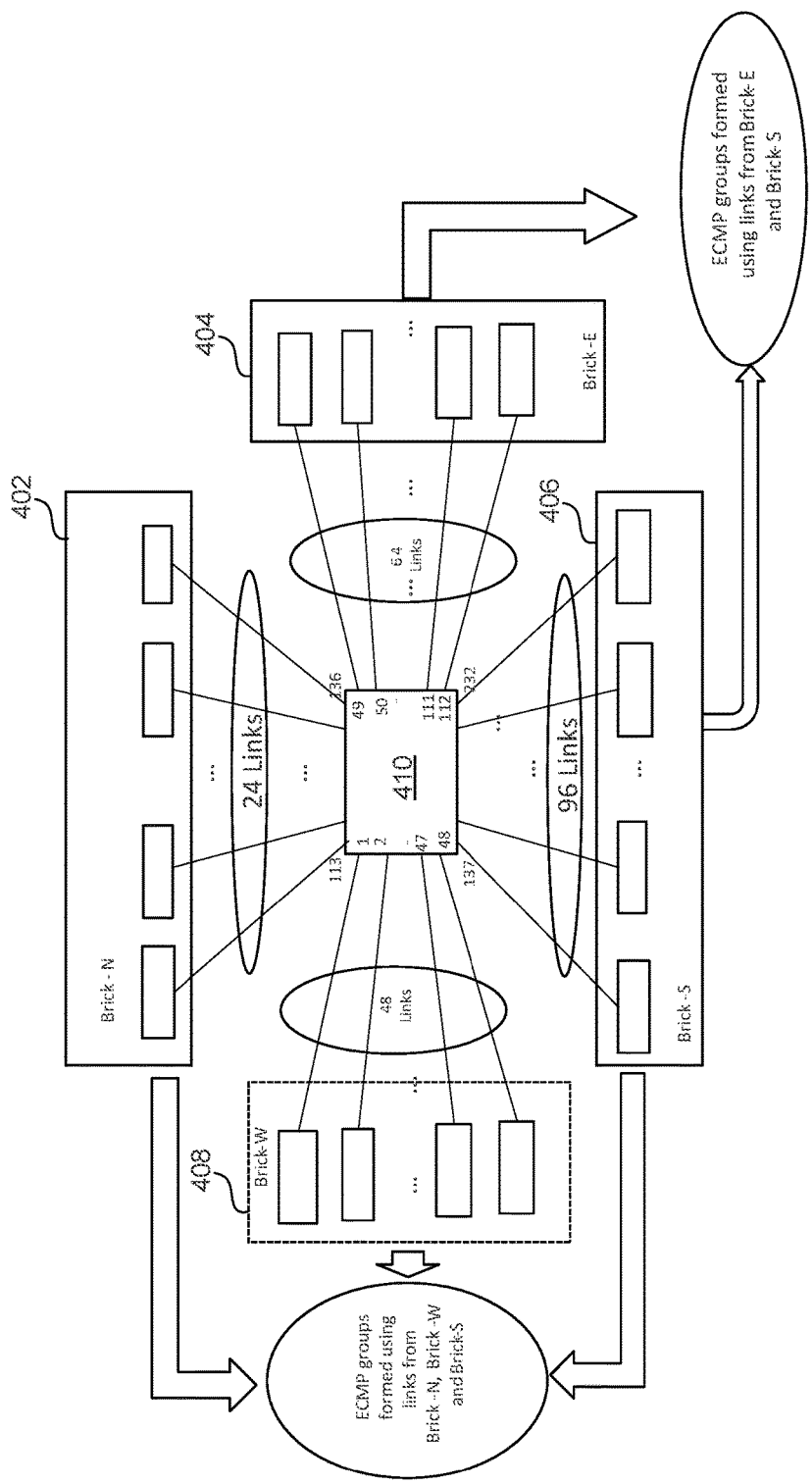
FIG. 9 is a block diagram illustrating one embodiment of allocating a size for an ECMP group formed with interfaces connected to multiple bricks, in accordance with the present disclosure.

In accordance with at least some of the disclosed embodiments, a method for determining the optimum size for an ECMP group may include using interfaces connected to a single brick only, as shown in FIG. 8, or using interfaces connected to multiple bricks, as shown in FIG. 9.

FIG. 8 shows an example embodiment for allocating an optimal hardware resources for an ECMP group formed with interfaces connected to a single brick. As shown in FIG. 8, one ECMP group may be formed from the 48 links associated with the interfaces numbered 1 to 48 that are connected to the Brick-W 408 and another ECMP group can be formed from the 64 links associated with the interfaces numbered 49-112 that are connected to the Brick-E 404.

According to certain embodiments of the present disclosure, the method may include obtaining a plurality of configured interface sets (CIS), which may be a plurality of sets of interfaces containing statically configured interfaces based on a network architecture. For example, referring to FIG. 8, the configured interface set CIS-W of the network device 410 to the Brick-W includes 48 interfaces numbered {1, 2, 3, . . . , 48}, each of which is connected to one of the switches of the Brick-W. Similarly, the configured interface set CIS-E of network device 410 to Brick-E includes 64 interfaces numbered {49, 50, 51, . . . , 112}, each of which may be connected to one of the switches of the Brick-E. The configured interface set CIS-N of the network device 410 to the Brick-N includes 24 interfaces numbered {113, 114, 115, . . . , 136}, each of which is connected to one of the switches of the Brick-N. The configured interface set CIS-S of the network device 410 to the Brick-S includes 96 interfaces numbered {137, 138, 139, . . . , 232}, each of which is connected to one of the switches of the Brick-S.

Note that these interfaces are statically assigned because they represent a connection from the network device to one of the neighbors. For this reason, a single interface may only belong to one configured interface set because it can have only one link connected to one neighbor (e.g., a switch, router, network device). It is understood that the number of interfaces of the network device to the next-hop neighbors can be any integer number N. In the example shown in FIG. 8, 48 links associated with the interfaces numbered 1 to 48 are used in the Brick-W, 64 links associated with the interfaces numbered 49 to 112 are used in the Brick-E, 24 links associated with the interfaces numbered 113 to 136 are used in the Brick-N, and 96 links associated with the interfaces numbered 137 to 232 are used in the Brick-S. However, it is understood that these numbers are arbitrarily chosen for describing the example embodiment and should not be limiting. In general, it is understood that network devices in a data center can have a very large numbers (e.g., tens of thousands) of ECMP group creation resources available for creation of ECMP groups upon request from management entity.

Referring still to FIG. 8, a configured interface set is referred to as a set of interfaces containing statically configured interfaces based on an architecture of a network system. For example, the configured interface set (CIS) of interfaces from the network device 410 to the Brick-W is abbreviated as CIS-W and has an allocation size (statically configured interfaces) of 48, and the interfaces are numbered from 1 to 48. The CIS of interfaces from the network device 410 to the Brick-E is abbreviated as CIS-E and has an allocation size of 64, and the interfaces are numbered from 49 to 112. Similarly, the CIS of interfaces from the network device 410 to the Brick-N is abbreviated as CIS-N and has an allocation size of 24, and the interfaces are numbered from 113 to 136, and the CIS of interfaces from the network device 410 to the Brick-S is abbreviated as CIS-S and has an allocation size of 96, and the interfaces are numbered from 137 to 232.

Table 1 shows some interface sets (IS) of the configured interface sets (CIS), the associated allocation sizes, and the CIS ranges in accordance with the example network architecture of FIG. 8. An interface set is formed of a combination of multiple configured interface sets. Examples of interface sets will be provided below. In certain instances, Table 1 may also referred to as an interface set-allocation size table (IS-AST).

TABLE 1

| Interface set (IS) | Allocation size | CIS interface ranges |
| --- | --- | --- |
| E | Configured size (CS) of CIS-E = 64 | CIS-E = {49, 50, . . . , 112} |
| W | CS of CIS-W = 48 | CIS-W = {1, 2, . . . , 48} |
| N | CS of CIS-N = 24 | CIS-N = {113, 114, . . . , 136} |
| S | CS of CIS-S = 96 | CIS-S = {137, 138, . . . , 232} |

The allocation size is the size (number of interfaces) to be allocated for an interface set (formed of all possible combinations of configured interface sets) while forming a new ECMP group or resizing a current ECMP group.

In one example next-hop network architecture, the available sizes of the hardware resource groups may be 24, 48, 64, 72, 96, 120, 144, and 168. It is understood the sizes (number of interfaces) of the hardware resource groups are arbitrarily chosen for implementing example network systems of the present disclosure and are not limiting.

Figure 10:
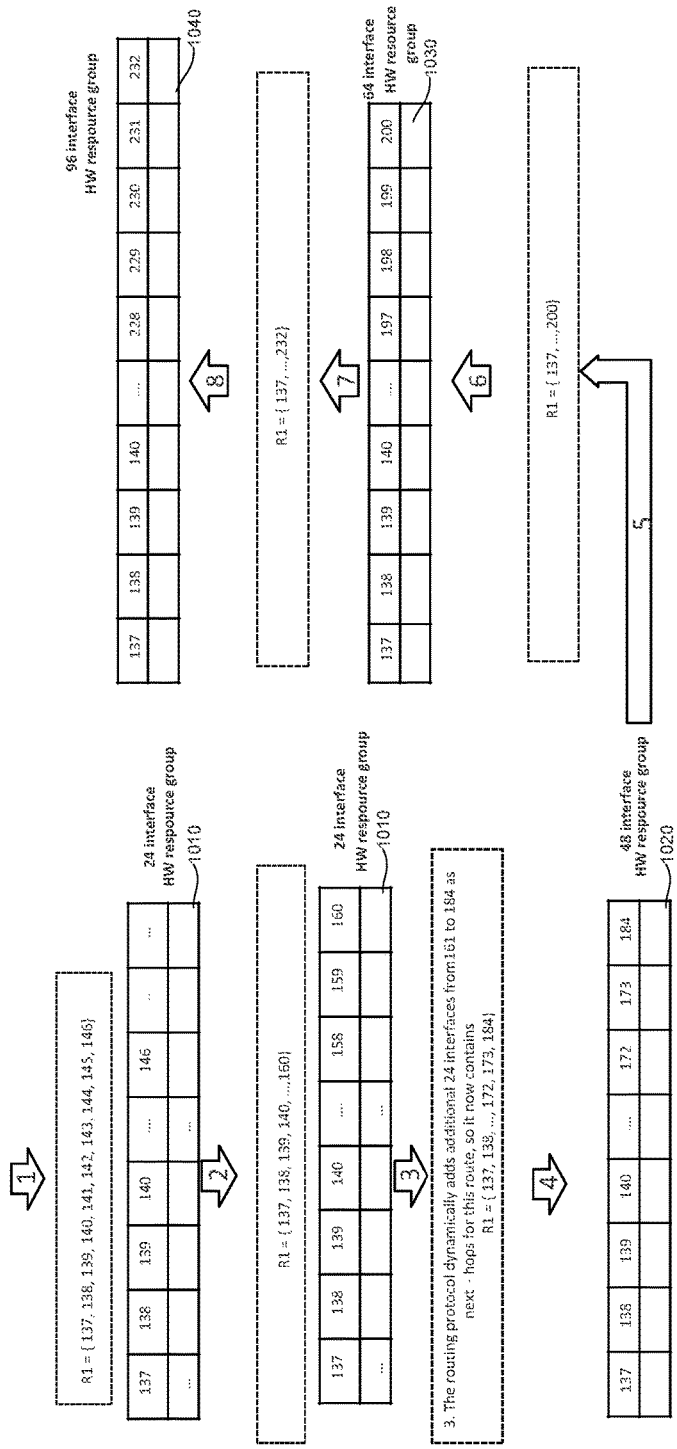
FIG. 10 is a diagram illustrating a conventional process of allocating hardware resources for an ECMP group according to the prior art.

FIG. 10 shows a conventional method of allocating an ECMP group in a network system. Referring to FIG. 10, a route may initially have 10 next-hop interfaces, for example, R1={137, 138, 139, 140, 141, 142, 143, 144, 145, 146} (indicated by an arrow denoted "1"). The conventional ECMP-group resource allocation module or software allocates a 24-interface hardware resource group since the size of 24 interfaces is available from the hardware resource group pool (indicated by block 1010). When the routing protocol dynamically adds 14 additional interfaces to this route so that this route now contains R1={137, 138, . . . , 158, 159, 160}, as indicated by arrow "2", the currently assigned hardware resource group of the size of 24 can still accommodate these 14 interfaces (block 1010).

Next, if the routing protocol further dynamically adds 24 additional interfaces as next-hops for this route, so the route now contains R1={137, 138, . . . , 183, 184} (indicated by an arrow denoted "3"), this forces the ECMP group to move to the next higher sized hardware resource group of 48 interfaces (indicated by an arrow denoted "4" and block 1020).

If the routing protocol further dynamically adds 16 additional interfaces for this route, so that R1={137, 138, . . . , 200} as indicated by an arrow denoted "5," the additional 16 interfaces force (indicated by an arrow denoted "6") the route group to be moved to the next higher-sized hardware resource group having 64 interfaces (block 1030). If the routing protocol further dynamically adds 32 additional interfaces, so that R1={137, 138, . . . , 232} (indicated by an arrow denoted "7"), this addition forces the route group to be moved to a next higher-sized hardware resource group that has 96 interfaces (block 1040).

After this 96-interface route group has been created, the route group has the maximum use count of 96. The use count is defined as the number of active interfaces in an interface set. The size of the currently allocated hardware ECMP group is initialized to 96.

As discussed previously, moving packet traffic from one hardware resource group to another hardware resource group may be very time consuming and the process may be complex. Embodiments disclosed herein provide methods, devices, and systems to minimize such moves of the ECMP group from one hardware resource group to another. Embodiments disclosed herein exploit properties and knowledge of the network architecture to improve the allocation of resources to an ECMP group. For example, in certain embodiments, the network device may automatically learn from the currently configured network architecture the size of the allocation of hardware resources for future ECMP-group creations and modifications.

Figure 11:
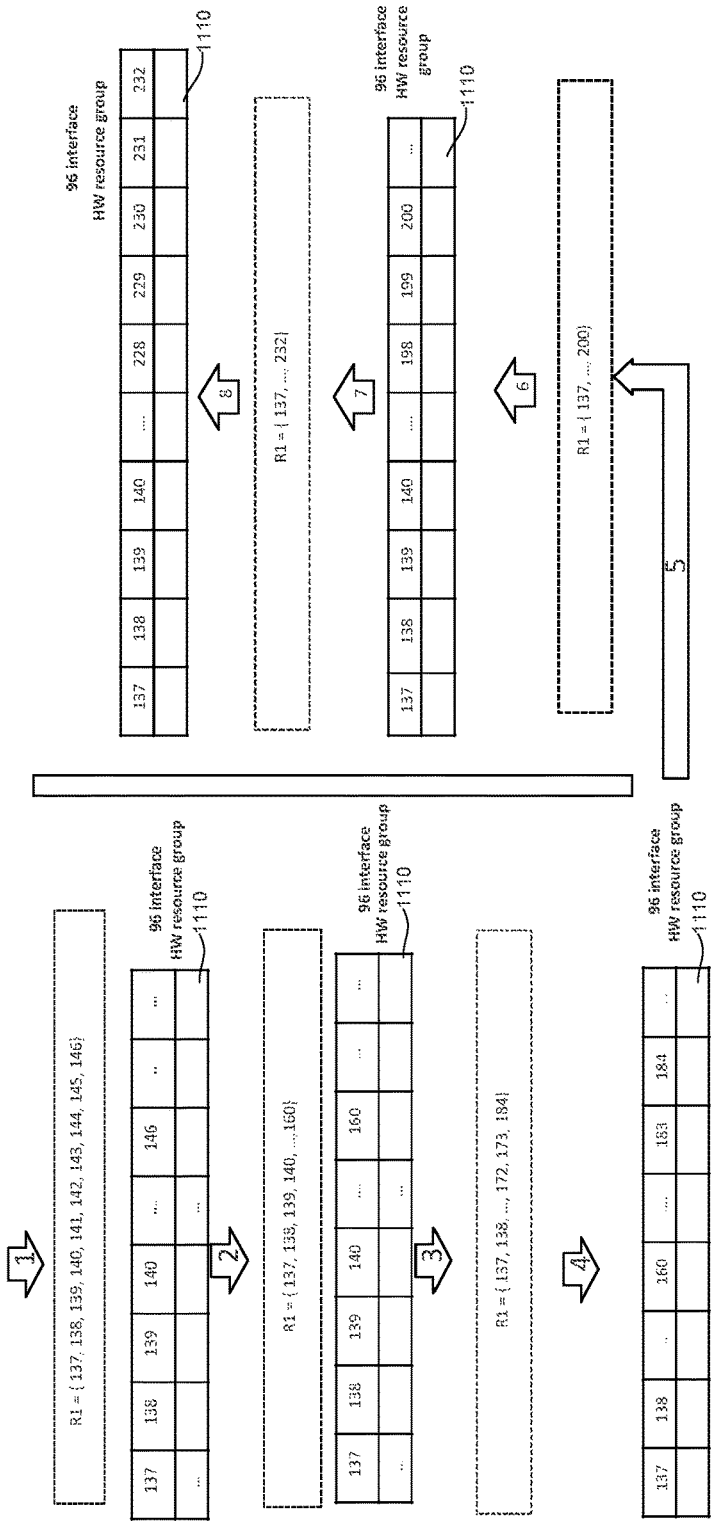
FIG. 11 is an example diagram illustrating a process of allocating hardware resources to an ECMP group, in accordance with the present disclosure.

FIG. 11 is a flowchart diagram illustrating a method of allocating optimal hardware resources for an ECMP group in a network system according to one embodiment of the present disclosure. In the example embodiment shown in FIG. 11, a route initially has 10 next-hop interfaces, for example, R1={137, 138, 139, 140, 141, 142, 143, 144, 145, 146} (indicated by an arrow denoted "1"). The Open Shortest Path First (OSPF) protocol, management module, software or routing protocol of the network device allocates the 96-interface hardware resource group (block 1110) based on the IS-AST table since the interface range R1 is within the CIS-S (see Table 1). If the ECMP-group resource allocation logic adds 14 additional interfaces numbered 147 to 160 to this route, so that this route now contains R1={137, 138, . . . , 158, 159, 160}, the currently assigned hardware resource group of the size of 96 can still accommodate these 14 interfaces (as indicated by arrow "2" and block 1110).

Next, if the routing protocol dynamically adds additional interfaces 24 interfaces (indicated by an arrow denoted "3") as next-hops for this route, so the route now contains R1={137, 138, . . . , 183, 184}, the currently assigned hardware resource group still can accommodate these 24 additional interfaces (as indicated by an arrow denoted "4" and block 1010).

If the routing protocol further dynamically adds 16 additional interfaces for this route, so that R1={137, 138, . . . , 200} as indicated by an arrow denoted "5," the currently assigned hardware resource group still can accommodate these 16 additional interfaces (as indicated by an arrow denoted "6" and block 1110). If the routing protocol needs to further dynamically add 32 additional interfaces, so that R1={137, 138, . . . , 232} as indicated by an arrow denoted "7", the currently assigned hardware resource group still can accommodate these 32 additional interfaces, as indicated by an arrow "8" and block 1110. Thus, according to the embodiment of the present disclosure, the ECMP group resource allocation based on the CIS interface indices and the range values of the IS-AST table provides significantly simple hardware resource allocation and significantly reduces the number of moves of the ECMP group from one hardware resource group to another, compared to the approach discussed with reference to FIG. 10. Such an approach significantly improves the performance of the network device.

FIG. 9 shows an example embodiment for allocating optimal hardware resources for an ECMP group formed with interfaces connected to multiple bricks. As shown in FIG. 9, an ECMP group may be formed from the 48 links associated with interfaces numbered 1 to 48 that are connected to the Brick-W 408, the 24 links associated with interfaces numbered 113 to 136 that are connected to the Brick-N 402, and the 96 links associated with interfaces numbered 137 to 232 that are connected to the Brick-S 406. Similarly, another ECMP group may also be formed from the 64 links associated with the interfaces numbered 49 to 112 that are connected to the Brick-E 404, and the 96 links associated with the interfaces numbered 137 to 232 that are connected to the Brick-S 406.

Table 2 shows all of the possible valid interface sets (IS) of the configured interface sets (CIS), the associated allocation sizes (number of interfaces), and the CIS interface number ranges according to one embodiment of the present disclosure.

TABLE 2

| Interface set (IS) | Allocation size | CIS interface number range |
|---|---|---|
| E | Configured size (CS) of CIS-E = 64 | CIS-E = {49-112} |
| W | CS of CIS-W = 48 | CIS-W = {1-48} |
| N | CS of CIS-N = 24 | CIS-N= {113-136} |
| S | CS of CIS-S = 96 | CIS-S = {137-232} |
| E, W | CS of CIS-E + CS of CIS-W = 112 | {1-48} and {49-112} |

TABLE 2-continued

| Interface set (IS) | Allocation size | CIS interface number range |
|---|---|---|
| E, N | CS of CIS-E + CS of CIS-N = 88 | {1-48} and {113-136} |
| E, S | CS of CIS-E + CS of CIS-S = 160 | {1-48} and {137-232} |
| W, N | CS of CIS-W + CS of CIS-N = 72 | {1-48} and {113-136} |
| W, S | CS of CIS-W+ CS of CIS-S = 144 | {1-48} and {137-232} |
| N, S | CS of CIS-N + CS of CIS-S = 120 | {113-116} and {137-232} |
| E, W, N | CS of CIS-E + CS of CIS-W + CS of CIS-N = 136 | {1-48} and {49-112} and {113-136} |
| E, W, S | CS of CIS-E + CS of CIS-W + CS of CIS-S = 208 | {1-48} and {49-112} and {137-232} |
| E, N, S | CS of CIS-E + CS of CIS-N + CS of CIS-S = 184 | {49-112} and {113-136} and {137-232} |
| W, N, S | CS of CIS-W + CS of CIS-N + CS of CIS-S= 168 | {1-48} and {113-136} and {137-232} |
| E, W, N, S | CS of CIS-E + CS of CIS-W + CS of CIS-N + CS of CIS-S = 232 | {1-48} and {49-112} and {113-136} and {137-232} |

As can be inferred from Table 2, the allocation size of the interface set {E, S} is 160, which is the sum of the configured interface sets CIS-E and CIS-S (64+96), and the interface number ranges of the interface set {E, S} are between 49 and 112 and between 137 and 232. Similarly, the allocation size of the interface set {W, N, S} (the second last row in Table 2) is 168, which is the sum of the configured interface sets CIS-W, CIS-N, and CIS-S (48+24+96), and the interface number ranges of the interface set {W, N, S} are between 1 and 48, between 113 and 136, and between 137 and 232.

EXAMPLE METHOD EMBODIMENTS

Embodiments of the present disclosure provide methods and devices for allocating optimal hardware resource for an ECMP group for distributing traffic across a computer network device. These methods may be performed in the network device, which can be a network processor having hardware and/or software integral to the network device. The network processing logic may include, for example, circuit logic, hardware and software modules operative to perform the methods. The destination device may be a server comprising a multitude of hosts or virtual machines connected to each other through multiple switches, a next-hop network device, a switch fabric, and the like.

Figure 12:
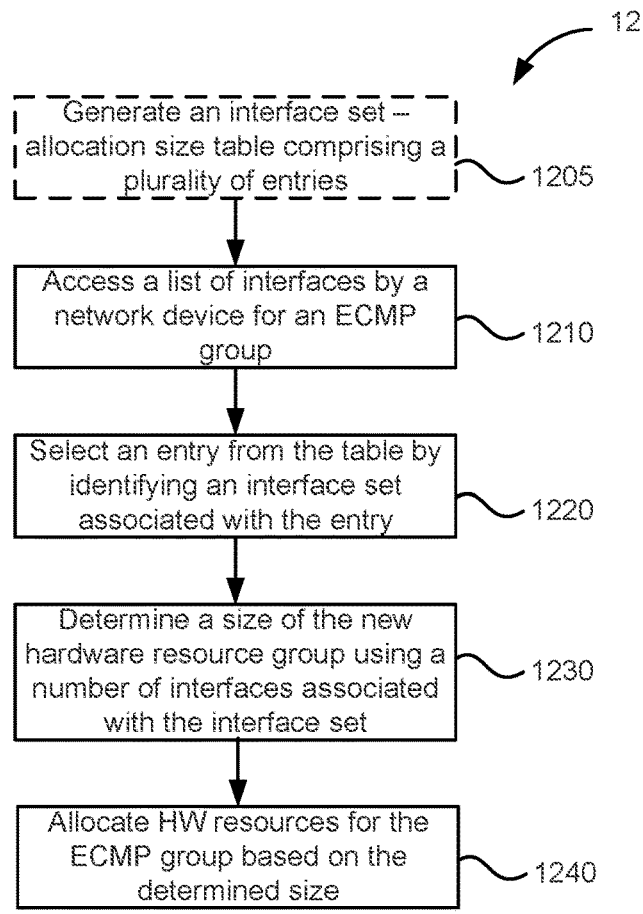
FIG. 12 is a flowchart illustrating a method for determining hardware resources for an ECMP group according to one embodiment.

FIG. 12 is a simplified flowchart illustrating a method 12 for determining optimal hardware resources for an ECMP group according to an embodiment of the present disclosure. Method 12 may be implemented by the network device 410 shown in FIG. 4. Method 12 includes obtaining or accessing a list of interfaces for a ECMP group for which hardware resources need to be allocated by a network device (block 1210). The list of interfaces can be provided by a user (e.g., a data center operator) or by an algorithm, management software or protocol executed by the network device. Method 12 also includes selecting an entry from a table by identifying an interface set associated with the entry, which includes the list of interfaces (block 1220). In some embodiments, the set of interfaces may include an entire first configured interface set, a portion of a second configured interface set, an entire set of a portion of a third configured interface set, and so forth. It is understood that the first, second, third, and other configured sets are known to the network device a priori, for example, the configured interface sets are preconfigured and known to the network device at the start-up time, or they can be determined by the network device at run time. In other words, the network device may generate an interface set—allocation size table at run-time before or during block 1210, or the interface set—allocation size table is provided to the network device at start-up time or before block 1210 (shown as dashed-line block 1205). Table 2 provides an example interface set—allocation size table. At block 1230, the method 12 implemented by the network device, further includes determining a size of the ECMP group using a number of interfaces associated with the identified interface set from the table. In some embodiments, the size of the ECMP group is determined by looking up from the interface set—allocation size table (e.g., IS_AST Table 2). At block 1240, the method 12 includes allocating hardware resources from a pool of hardware resource groups for the ECMP group based on the determined size of the ECMP group. The hardware resources may include a limited number of fixed memory blocks.

The following example embodiment provides numerical values illustrating method 12. For example, the accessed list of interfaces is {1, 2, 100, 101, 150, 160}. The above-described Table 2, which may be provided to the network device or generated by the network device at start-up time, shows that the interfaces {1, 2} belong to the configured interface set CIS-E, the interfaces {100, 101} belong to the configured interface set CIS-N, and the interfaces {150, 160} belong to the configured interface set CIS-S. Thus, the formed interface set by the network device is IS={E, N, S}. Thus, the network device can determine the size of the ECMP group by looking up for the interface set IS={E, N, S} from the interface set—allocation size table. In this example embodiment, the size of the ECMP group is determined to be 184 (64 of CIS-E, 24 of CIS-N, and 96 of CIS-S).

Figure 13:
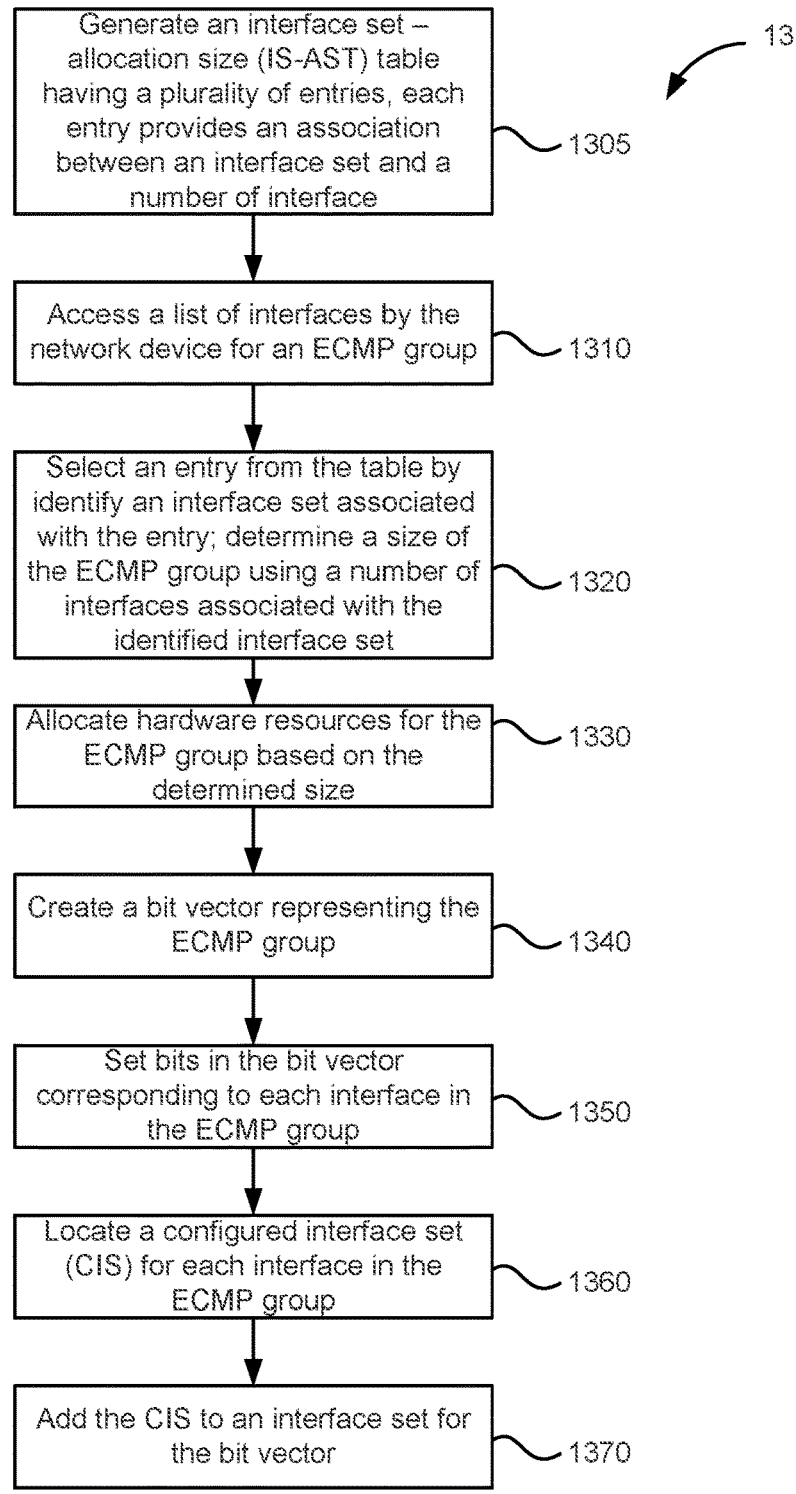
FIG. 13 is a flowchart illustrating a method for computing hardware resources for an ECMP group according to another embodiment.

FIG. 13 is a simplified flowchart illustrating a method 13 for efficiently allocating optimal hardware resources for an ECMP group by a network device according to an embodiment of the present disclosure. The network device (e.g., network device 410 in FIG. 4) may include processing logic configured to efficiently allocate hardware resources for ECMP groups to minimize updating the hardware resources when additional interfaces are identified for the ECMP group and/or removed from the ECMP groups. Method 13 may include generating or obtaining an interface set—allocation size (IS-AST) table by the network device at block 1305. In certain embodiments, the IS-AST table is generated by the network device and stored in a memory that can be integral to the network device or external to the network device. In yet other embodiments, the IS-AST table is provided to the network device and stored in an internal memory. The IS-AST table may include a multitude of entries, each of the entries providing an association between an interface set and a number of interfaces, and the interface set represents a list of interfaces for the network device for a network connection. Method 13 also includes obtaining or accessing a list of interfaces by the network device (block 1310) for allocating hardware resources for an ECMP group. In one embodiment, the list of interfaces for the ECMP group can be provided by a user (e.g., a data center operator), provided by the network device, or provided to the network device by another device. At block 1320, the method 13 includes selecting an entry from the multitude of entries from the table by identifying an interface set associated with the entry. The entry includes the obtained or accessed list of interfaces. The method 13 also includes determining a size of the ECMP group using a number of interfaces associated with the interface set from the entry of the table. The method also includes determining a size of the ECMP group using a number of interfaces associated with the identified interface set. At block 1330, the method 13 includes allocating hardware resources for the ECMP group based on the determined size. At block 1340, the method 13 further includes creating (generating) a bit vector having a plurality of bits each associated with an interface of the ECMP group. At block 1350, the method 13 includes setting bits in the bit vector corresponding to each active interface in the new ECMP group. At block 1360, the method 13 also includes determining a configured interface set (CIS) for each interface in the new ECMP group and (at block 1370) adding the determined CIS to the interface set (IS) for the bit vector.

Figure 14:
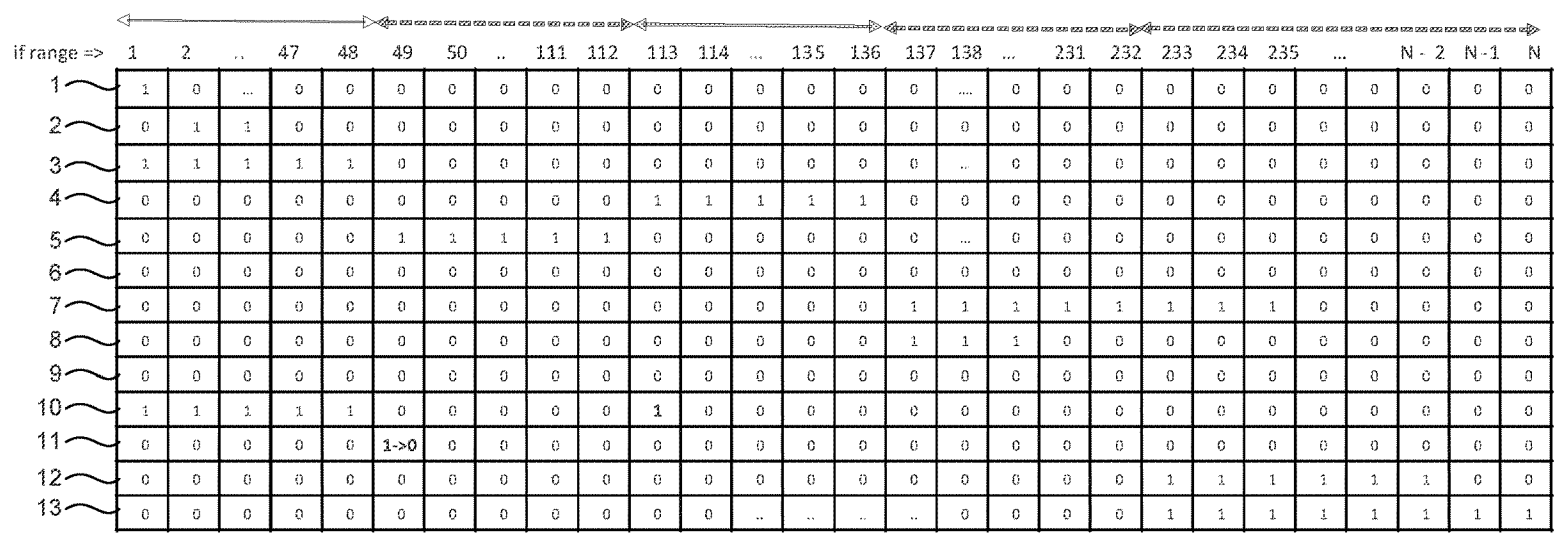

FIG. 14 shows a bit-vector representation of each ECMP group in a network device according to an embodiment of the present disclosure. The present disclosure, according to one embodiment, utilizes a bit vector to represent each ECMP group in the network device. The maximum number of egress interfaces available to the network device (e.g., network device 410 of FIG. 4) is N. The N interfaces may be divided into multiple ranges, which may correspond to the configured interface sets of the network device. In the example shown in FIG. 14, the N interfaces are divided into a first set having an interface range from 1 to 48, a second set having an interface range from 49 to 112, a third set having an interface range from 113 to 136, a fourth set having an interface range from 137 to 232, and a fifth set having a range from 233 to N. In the vertical direction, a number of bit vectors having a plurality of bits are shown, each bit vector contains a bit representing each interface in the system. In the example shown in FIG. 14, five configured interface sets are used, each having a different range (e.g., 1-48, 49-112, 113-136, 137-232, and 233-N). A number of 13 rows are shown in the vertical direction. Each of these 13 rows represents a bit vector for an ECMP group. However, it is understood that these 5 configured interface sets and the 13 bit vectors are arbitrarily chosen for describing the example embodiment and should not be limiting.

Each bit set to "1" in the bit vector indicates that the corresponding interface is an active interface to participate in the traffic distribution in the network device for that particular ECMP group. Conversely, a bit set to "0" in the bit vector indicates that the corresponding interface is not active to participate in the traffic distribution for the respective ECMP group. It is noted that all the interfaces regardless whether they are set to "1" or "0" may be eligible interfaces in the ECMP group. In the example shown in FIG. 14, the first bit vector in the first row 1 has the first bit set to "1" and the remaining of bits set to "0." That means only the interface numbered 1 of the ECMP group of the range 1 to 48 is an active interface, and the 47 remaining interfaces of the ECMP group are not active to participate in the traffic.

According to certain embodiments of the present disclosure, the number of bits set to "1" in a bit vector corresponds to the use count of the ECMP group. In other words, the use count is the number of active interfaces in an interface set to participate in the traffic distribution process. Referring still to FIG. 14, the use count of the first three rows (denoted by the reference numerals 1 through 3) can be any integer number from 1 to 48, the allocated hardware resource group size is 48, and the interface set is the set (W) (see also IS-AST Table 2). The use count of the fourth row (denoted by the reference numeral 4) can be any integer number from 1 to 24, the allocated hardware resource group size is 24, and the interface set is the set (N). The use count of the fifth row (denoted by the reference numeral 5) can be any integer number from 1 to 64, the allocated hardware resource group size is 64, and the interface set is the set (E). The use count of the seventh and eighth rows (denoted by the reference numerals 7 and 8) can be any integer number from 1 to 96, the allocated hardware resource group size is 96, and the interface set is the set (S). The use count of the tenth row (denoted by the reference numeral 10) can be any integer number from 1 to 48, the allocated hardware resource group size is 48, and the interface set is the set (W). The use count of the last row (denoted by the reference numeral 13) can be any integer number from 1 to 128, the allocated hardware resource group size is 128, and the interface set is the set (N, W).

In an example embodiment, if the network device has a 48-interface ECMP group with interfaces numbered 1 through 39 as its currently active interfaces, then bits 1 through 39 are set to "1" in the bit vector, and the rest of the bits corresponding to all remaining ECMP eligible interfaces are set to "0". In another example embodiment, if the network device has a 64-interface ECMP group with interfaces numbered 49 through 100 as its currently active members, then bits 1 through 48 are set to "0,", bits 49 through 100 are set to "1", and all remaining bits are set to "0."

Note that, when the network device creates a new ECMP group, it assigns hardware resources based on best granularity offered by the network device. For example, an ECMP group may contains 17 interfaces (or use count), but the allocatable hardware resource groups may only be available in the size of 8, 16, 32, 64, or 128 interfaces. Thus, for an ECMP group initially contains 17 active interfaces, the network device may allocate a hardware resource group containing 32 interfaces to best match the current use count.

Each bit vector is associated with the ECMP group it represents. The bits corresponding to the interfaces that are part of the ECMP group are set in the bit vector. Bits in a bit vector are set when new interfaces associated with those bits are added and reset when old interfaces associated with those bits are deleted.

Figure 15:
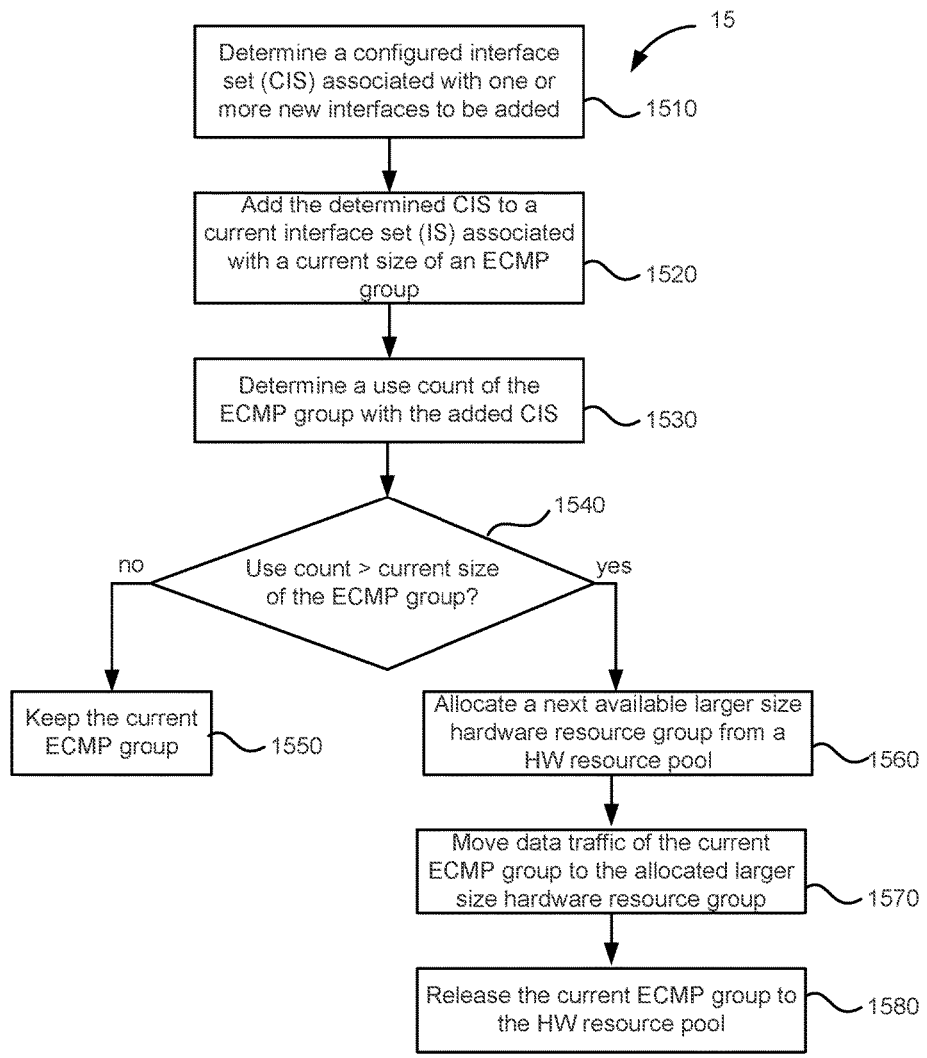
FIG. 15 is a flowchart illustrating a method for adding an interface to an ECMP group according to one embodiment.

FIG. 15 is a flowchart illustrating a method 15 for adding one or more new identified interfaces into a current ECMP group. At block 1510, components of the network device determine a configured interface set (CIS) associated with one or more new interfaces to be added to a current ECMP group. At block 1520, components of the network device add the determined configured interface set to a current interface set (IS) associated with a current size of the current ECMP group. At block 1530, components of the network device determines a use count of the ECMP group with the added one or more new interfaces. At block 1540, components of the network device determine whether the use count exceeds the current size (the maximum number of interfaces that the current hardware resources can accommodate for the ECMP group). In the event that the use count does not exceed the current size for the ECMP group, there is no change to the size of the current ECMP group (block 1550). In the event that the use count exceeds the current size of the ECMP group, components of the network device performs block 1560 that includes allocating a larger size hardware resource group. At block 1570, components of the network device move the traffic of the current ECMP group to the allocated larger size hardware resource group. At block 1580, components of the network device releases the current ECMP group back to the pool of the hardware resource groups.

Referring back to FIG. 14, the bit vector at the row 10 has its bits in the range from 1 to 48 set to "1", so that the bit vector at the row 10 represents the interface set IS=CIS (W). Assuming that one additional interface having a bit position "113" is added (shown as a "1") (block 1510 of FIG. 15), this added interface is determined to belong to the configured interface set CIS-N (see Tables 1 and 2). The determined CIS-N is added to the current interface set (block 1520 of FIG. 15). The network device will determine a use count of the ECMP group (bit vector at row 10) with the newly added configured interface set having the range from 113 to 136 (block 1530). If the use count exceeds the size of the current ECMP group (CIS-W), then the network device will allocate a next larger hardware resource group from the pool of hardware resource groups (block 1560). For example, the next larger size can be determined from the interface set—allocation size table (Table 2) and the interface set IS=(W, N).

Figure 16:
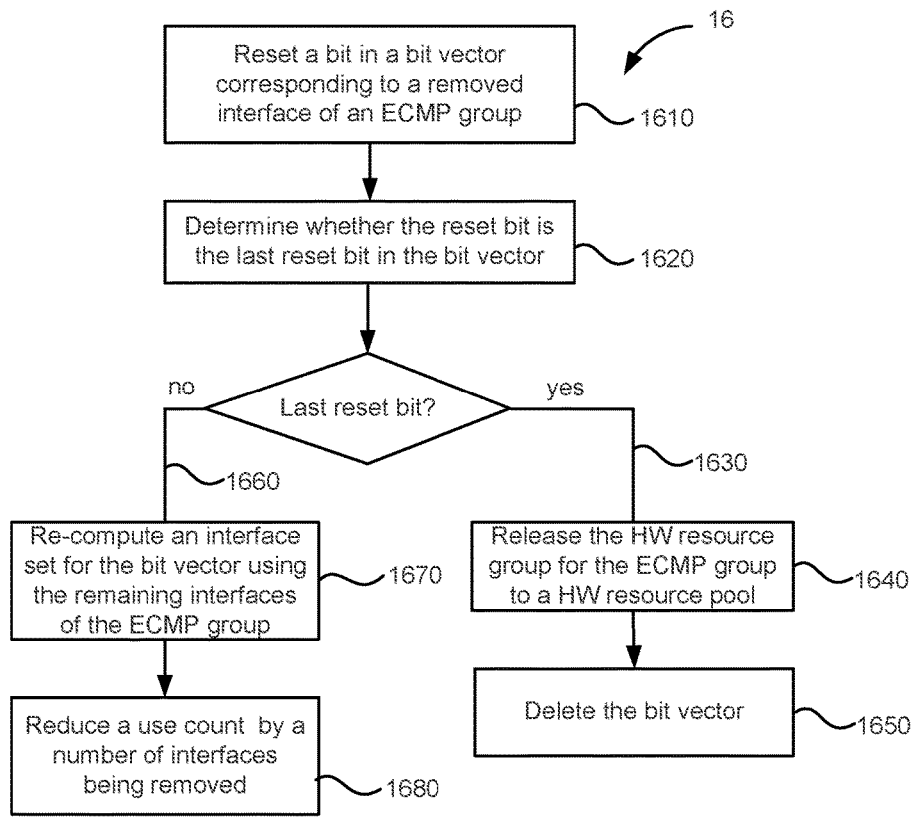
FIG. 16 is a flowchart illustrating a method for deleting or removing an interface to an ECMP group according to one embodiment.

FIG. 16 is a simplified flowchart illustrating a technique for deleting or removing one or more interfaces from a current ECMP group having a plurality of ECMP interfaces according to one embodiment of the present disclosure. According to one representative example, the current ECMP group is represented by a bit vector having a plurality of bits, where the bit vector represents the ECMP group, and each bit of the bit vector represents each one of the interfaces of the ECMP group. At block 1610, components of the network device, reset a bit which corresponds to a removed or deleted interface of the ECMP group. At block 1620, components of the network device, may determine whether the reset bit is the last reset bit in the bit vector, i.e., whether the removed interface is the last interface in the ECMP group. In the event that the reset bit is the last reset bit in the bit vector (i.e., the removed interface is the last interface) (yes, block 1630), the hardware resources associated with the ECMP group is released to a hardware resource pool (block 1640) and the bit vector is deleted (block 1650). In the event that the reset bit in the bit vector is not the last reset bit (i.e., the removed interface is not the last interface); that is, there are more interfaces left in the ECMP group (no, block 1660), components of the network device re-compute an interface set for the bit vector using the remaining interfaces in the ECMP group (block 1670), and reducing a use count by a number of the interfaces being removed (block 1680).

Referring back to FIG. 14, the above example of FIG. 16 illustrated a method for updating the current ECMP group (representing by the bit vector at row 11) when an existing interface is deleted or removed from the ECMP group, i.e., the bit vector at the row 11 has the bit position "49" reset to "0" from an original "1". The network device (e.g., the network device 410 of FIG. 4) determines whether it is the last reset bit in the bit vector. If it is the last bit (block 1630), the network device will release the hardware resource group associated with the ECMP group back to the pool of hardware resource groups and delete the bit vector at row 11.

Figure 17:
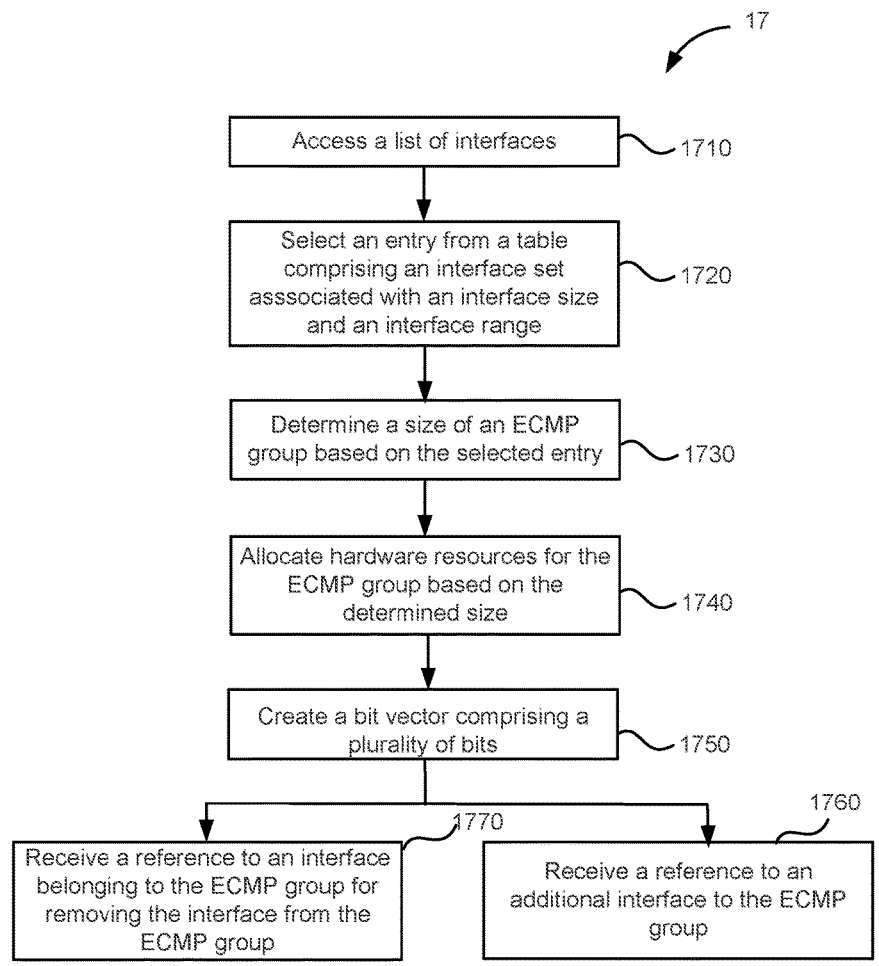
FIG. 17 is a flowchart illustrating a method for allocating hardware resources for an ECMP group according one embodiment.

FIG. 17 is a flowchart diagram for allocating hardware resources to a multi-path group that a network device uses to send packets to a brick (a switch fabric, a leaf, a spine, a next-level aggregation of data). The network device may include processing logic and memory storing instructions or program code executable by the processing logic for creating and managing ECMP groups, adding one or more interfaces to the ECMP groups or removing one or more interfaces from the ECMP groups. The network device may be the network device 410 shown in FIG. 4 and/or the network device discussed further in FIG. 18. Furthermore, aspects of the disclosure may be implemented using hardware, software, or any combination thereof.

The memory of the network device may include a table comprising a plurality of entries, each entry may include an interface set associated with an interface size (number of available interfaces) and a range (the range of the numbered interfaces). The interface size may be determined based on network architecture of the network system. In other words, each entry of the table provides an association between an interface set and a number of interfaces and each interface set represents a list of interfaces for the network device for a network connection. The network connection may be between the network device and another device or group of devices. In some instances, the network device discovers the interface size and interfaces belonging to an interface set over time. In other instances, the interface size may be provided to the network device. Table 2 is an example table, which may be stored in memory of the network device.

At block 1710, a list of interfaces is accessed by the network device. The list of interfaces may be accessed to allocate resources for an ECMP group. In some embodiments, the list of interfaces may be generated by the management module (e.g., 1806 of FIG. 18) from data collected from packets received from ingress ports of the network device, using protocols such as the OSPF protocol. The packets may be sent from one or more client devices, server devices, or other neighboring network devices. In other embodiments, the list of interfaces may be provided by a data center operator or a cloud-based system operator and stored in a memory module of the network device.

At block 1720, the network device selects an entry from the table by identifying an interface set associated with the list of interfaces. In one embodiment, the interface sets are known a priori, and the table may include all of the combinations of the interface sets of network device and stored in the memory of the network device.

At block 1730, the network device determines a size of an ECMP group using a number of interfaces associated with the interface set from the entry of the table.

At block 1740, the network device allocates hardware resources for the ECMP group based on the determined size. In certain embodiments, allocating the hardware resources may include allocating a hardware resource group from a pool of hardware resource groups, wherein the allocated hardware resource group comprises memory for accommodating a number of interfaces accommodated by the hardware resource group.

At block 1750, the network device creates a bit vector comprising multiple bits. Each bit of the bit vector represents an interface for the network device. The network device further sets a bit position in the bit vector corresponding to each of the interfaces from the list of interfaces indicating those interfaces as active interfaces for the ECMP group.

At block 1760, the network device may receive a reference to add an additional interface to the ECMP group. The network device determines that the additional interface will not increase the size of the ECMP group beyond the allocated hardware resources and sets a bit position in the bit vector corresponding to the additional interface. In the event that the network device determines that the additional interface increase the size of the ECMP group beyond the allocated hardware resources, the network device will allocate a new hardware resource group that is larger than the current hardware resource group, and set a bit position in the bit vector corresponding to the additional interface. The network device further moves information associated with the ECMP group to the new hardware resource group by transferring the information associated with the ECMP group stored in a memory block to a new memory block associated with the new hardware resource group.

At block 1770, the network device may receive a reference to an interface belonging to the ECMP group for removing the interface from the ECMP group and reset a bit position in the bit vector corresponding to the reference to the interface. The network device further determines whether the reference to the interface is the last interface in the ECMP group. In the event that the reference to the interface is the last interface in the ECMP group, the network device releases the hardware resource group for the ECMP group to the pool of hardware resource groups.

Computing Systems

Figure 18:
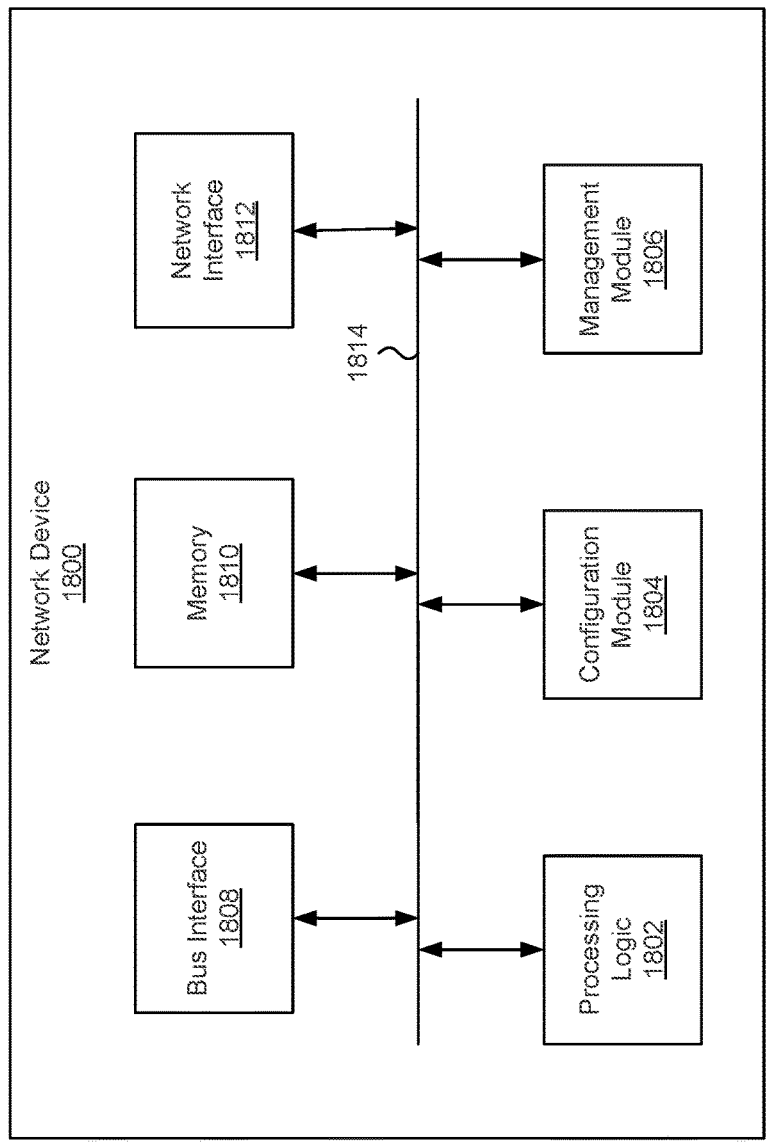
FIG. 18 illustrates an example of a network device, according to certain aspects of the disclosure.
Figure 19:
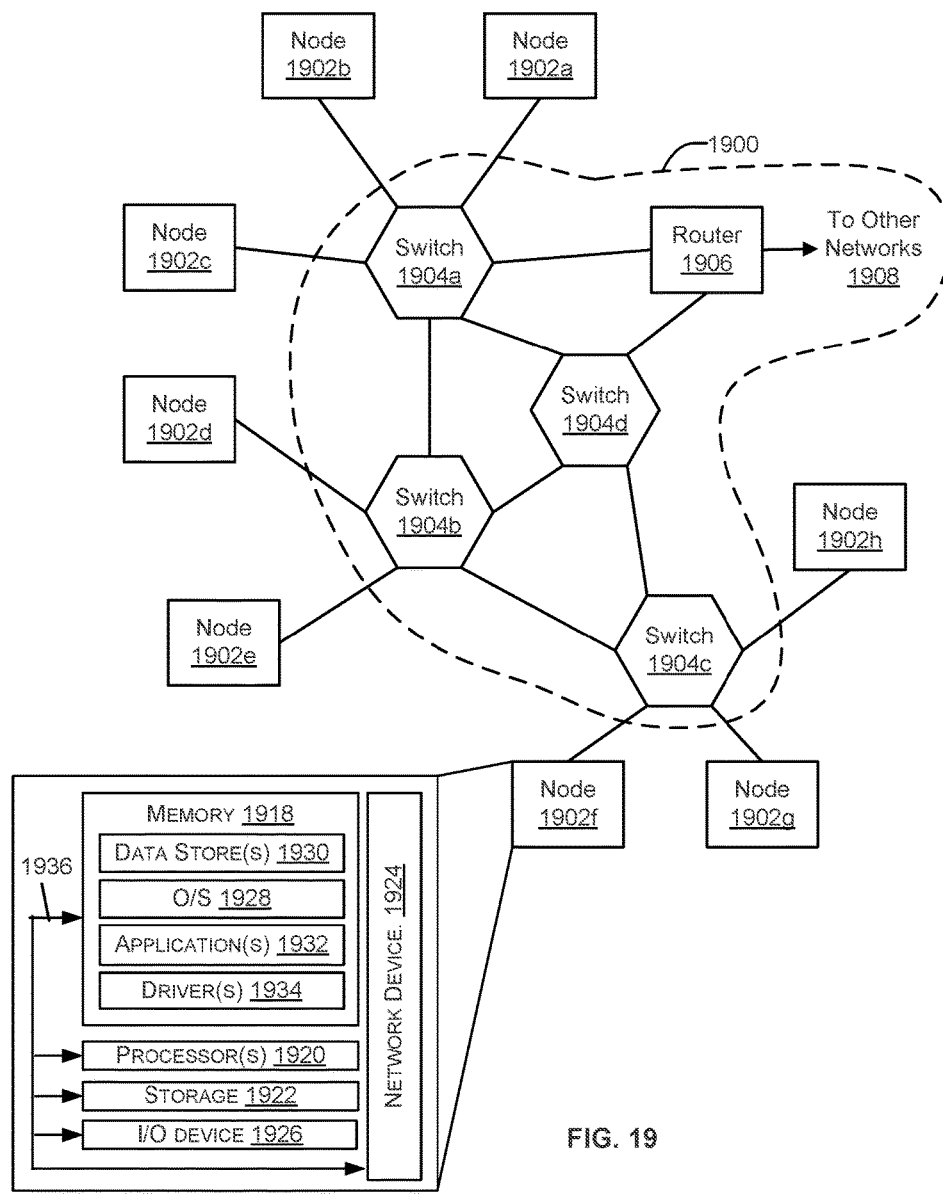
FIG. 19 illustrates an example architecture for features and systems described herein that includes one or more service provider computers and/or a user device connected via one or more networks, according to certain aspects of the disclosure.

FIGS. 18 and 19 illustrate examples of environments wherein embodiments of the inventive ideas can be practiced.

FIG. 18 illustrates an example of a network device 1800. Functionality and/or several components of the network device 1800 may be used without limitation with other embodiments disclosed elsewhere in this disclosure, without limitations. A network device 1800 may facilitate processing of packets and/or forwarding of packets from the network device 1800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1800 may be the recipient and/or generator of packets. In some implementations, the network device 1800 may modify the contents of the packet before forwarding the packet to another device. The network device 1800 may be a peripheral device coupled to another computer device, a switch, a router or any other suitable device enabled for receiving and forwarding packets.

In one example, the network device 1800 may include processing logic 1802, a configuration module 1204, a management module 1206, a bus interface module 1808, memory 1810, and a network interface module 1812. These modules may be hardware modules, software modules, or a combination of hardware and software. In certain instances, modules may be interchangeably used with components or engines, without deviating from the scope of the disclosure. The network device 1800 may include additional modules, not illustrated here, such as components discussed with respect to the nodes disclosed in FIG. 19. In some implementations, the network device 1800 may include fewer modules. In some implementations, one or more of the modules may be combined into one module. One or more of the modules may be in communication with each other over a communication channel 1814. The communication channel 1814 may include one or more busses, meshes, matrices, fabrics, a combination of these communication channels, or some other suitable communication channel.

The processing logic 1802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1202 may be stored on a computer-readable storage medium, for example, in the form of a computer program. The computer-readable storage medium may be non-transitory. In some cases, the computer-readable medium may be part of the memory 1810.

The memory 1810 may include either volatile or non-volatile, or both volatile and non-volatile types of memory. The memory 1810 may, for example, include random access memory (RAM), read only memory (ROM), Electrically Erasable Programmable Read-Only Memory (EEPROM), flash memory, and/or some other suitable storage media. In some cases, some or all of the memory 1810 may be internal to the network device 1800, while in other cases some or all of the memory may be external to the network device 1800. The memory 1810 may store an operating system comprising executable instructions that, when executed by the processing logic 1802, provides the execution environment for executing instructions providing networking functionality for the network device 1800. The memory may also store and maintain several data structures and routing tables for facilitating the functionality of the network device 1800.

In some implementations, the configuration module 1804 may include one or more configuration registers. Configuration registers may control the operations of the network device 1800. In some implementations, one or more bits in the configuration register can represent certain capabilities of the network device 1800. Configuration registers may be programmed by instructions executing in the processing logic 1802, and/or by an external entity, such as a host device, an operating system executing on a host device, and/or a remote device. The configuration module 1804 may further include hardware and/or software that control the operations of the network device 1800.

In some implementations, the management module 1806 may be configured to manage different components of the network device 1800. In some cases, the management module 1806 may configure one or more bits in one or more configuration registers at power up, to enable or disable certain capabilities of the network device 1800. In certain implementations, the management module 1806 may use processing resources from the processing logic 1802. In other implementations, the management module 1806 may have processing logic similar to the processing logic 1802, but segmented away or implemented on a different power plane than the processing logic 1802.

The bus interface module 1808 may enable communication with external entities, such as a host device and/or other components in a computing system, over an external communication medium. The bus interface module 1808 may include a physical interface for connecting to a cable, socket, port, or other connection to the external communication medium. The bus interface module 1808 may further include hardware and/or software to manage incoming and outgoing transactions. The bus interface module 1808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1808 may include the physical layer for any of these bus protocols, including a connector, power management, and error handling, among other things. In some implementations, the network device 1800 may include multiple bus interface modules for communicating with multiple external entities. These multiple bus interface modules may implement the same local bus protocol, different local bus protocols, or a combination of the same and different bus protocols.

The network interface module 1812 may include hardware and/or software for communicating with a network. This network interface module 1812 may, for example, include physical connectors or physical ports for wired connection to a network, and/or antennas for wireless communication to a network. The network interface module 1812 may further include hardware and/or software configured to implement a network protocol stack. The network interface module 1812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1200 may include multiple network interface modules, each configured to communicate with a different network. For example, in these implementations, the network device 1200 may include a network interface module for communicating with a wired Ethernet network, a wireless 802.11 network, a cellular network, an Infiniband network, etc.

In one embodiment, the memory 1810 may store a table comprising a plurality of entries, each of the entries may include an interface set associated with an allocation size and a interface number range, such as the interface set-allocation size table (IS_AST) of Table 1 and 2. A list of interfaces may be provided to the network device 1800 through the network interface 1812. The list of interfaces may include a number of interfaces that are active in the network device. The processing unit 1802 may include resource allocation logic (not shown) configured to access the list of interfaces and select an entry from the table by identifying an interface set associated with the list of interfaces, determine a size of an ECMP group using an allocation size associated with the identified interface set, and allocate hardware resources for the ECMP group based on the determined size. The processing unit 1802 may further include routing logic or processing logic (not shown) configured to receive a packet through the network interface 1812, determine that the packet is destined for a brick connected to the network device, identify the ECMP group as the group to route the packet to the brick, and transmit the packet over the identified ECMP group.

The various components and modules of the network device 1800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 19.

FIG. 19 illustrates a network 1900, illustrating various different types of network devices 1800 of FIG. 18, such as nodes comprising the network device, switches and routers. In certain embodiments, the network 1900 may be based on a switched architecture with point-to-point links. As illustrated in FIG. 19, the network 1900 includes a plurality of switches 1904a-1904d, which may be arranged in a network. In some cases, the switches are arranged in a multi-layered network, such as a Clos network. A network device 1800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1904a-1904d may be connected to a plurality of nodes 1902a-1902h and provide multiple paths between any two nodes.

The network 1900 may also include one or more network devices 1800 for connection with other networks 1908, such as other subnets, LANs, wide area networks (WANs), or the Internet, and may be referred to as routers 1906. Routers use headers and forwarding tables to determine the best path for forwarding the packets, and use protocols such as internet control message protocol (ICMP) to communicate with each other and configure the best route between any two devices.

In some examples, network(s) 1900 may include any one or a combination of many different types of networks, such as cable networks, the Internet, wireless networks, cellular networks and other private and/or public networks. Interconnected switches 1904a-1904d and router 1906, if present, may be referred to as a switch fabric, a fabric, a network fabric, or simply a network. In the context of a computer network, terms "fabric" and "network" may be used interchangeably herein.

Nodes 1902a-1902h may be any combination of host systems, processor nodes, storage subsystems, and I/O chassis that represent user devices, service provider computers or third party computers.

User devices may include computing devices to access an application 1932 (e.g., a web browser or mobile device application). In some aspects, the application 1932 may be hosted, managed, and/or provided by a computing resources service or service provider. The application 1932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1908. Additionally, the user device(s) may be part of the distributed system managed by, controlled by, or otherwise part of the service provider computer(s) (e.g., a console device integrated with the service provider computers).

The node(s) of FIG. 19 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources.

These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1332 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1902a-1902h may include at least one memory 1918 and one or more processing units (or processor(s) 1920). The processor(s) 1920 may be implemented in hardware, computer-executable instructions, firmware, or combinations thereof. Computer-executable instruction or firmware implementations of the processor(s) 1920 may include computer-executable or machine-executable instructions written in any suitable programming language to perform the various functions described.

In some instances, the hardware processor(s) 1920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1918 may store program instructions that are loadable and executable on the processor(s) 1920, as well as data generated during the execution of these programs. Depending on the configuration and type of the node(s) 1902a-1902h, the memory 1918 may be volatile (such as RAM) and/or non-volatile (such as ROM, flash memory, etc.). The memory 1918 may include an operating system 1928, one or more data stores 1930, one or more application programs 1932, one or more drivers 1934, and/or services for implementing the features disclosed herein.

The operating system 1928 may support nodes 1902a-1902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1928 may also be a proprietary operating system.

The data stores 1930 may include permanent or transitory data used and/or operated on by the operating system 1928, application programs 1932, or drivers 1934. Examples of such data include web pages, video data, audio data, images, user data, and so on. The information in the data stores 1930 may, in some implementations, be provided over the network(s) 1908 to user devices 1904. In some cases, the data stores 1930 may additionally or alternatively include stored application programs and/or drivers. Alternatively or additionally, the data stores 1930 may store standard and/or proprietary software libraries, and/or standard and/or proprietary application user interface (API) libraries. Information stored in the data stores 1330 may be machine-readable object code, source code, interpreted code, or intermediate code.

The drivers 1934 include programs that may provide communication between components in a node. For example, some drivers 1934 may provide communication between the operating system 1928 and additional storage 1922, network device 1924, and/or I/O device 1326. Alternatively or additionally, some drivers 1934 may provide communication between application programs 1932 and the operating system 1928, and/or application programs 1932 and peripheral devices accessible to the service provider computer. In many cases, the drivers 1934 may include drivers that provide well-understood functionality (e.g., printer drivers, display drivers, hard disk drivers, Solid State Device drivers). In other cases, the drivers 1934 may provide proprietary or specialized functionality.

The service provider computer(s) or servers may also include additional storage 1922, which may include removable storage and/or non-removable storage. The additional storage 1922 may include magnetic storage, optical disks, solid state disks, flash memory, and/or tape storage. The additional storage 1922 may be housed in the same chassis as the node(s) 1902a-1902h or may be in an external enclosure. The memory 1918 and/or additional storage 1322 and their associated computer-readable media may provide non-volatile storage of computer-readable instructions, data structures, program modules, and other data for the computing devices. In some implementations, the memory 1918 may include multiple different types of memory, such as SRAM, DRAM, or ROM.

The memory 1918 and the additional storage 1922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1918 and the additional storage 1922 are examples of computer storage media. Additional types of computer storage media that may be present in the node(s) 1902a-1902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1902a-1902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1902a-1902h may also include I/O device(s) 1926, such as a keyboard, a mouse, a pen, a voice input device, a touch input device, a display, speakers, a printer, and the like. The node(s) 1902a-1902h may also include one or more communication channels 1336. A communication channel 1936 may provide a medium over which the various components of the node(s) 1902a-1902h can communicate. The communication channel or channels 1336 may take the form of a bus, a ring, a switching fabric, or a network.

The node(s) 1902a-1302h may also contain network device(s) 1924 that allow the node(s) 1902a-1902h to communicate with a stored database, another computing device or server, user terminals and/or other devices on the network(s) 1900. The network device(s) 1924 of FIG. 19 may include similar components discussed with reference to the network device 1800 of FIG. 18.

In some implementations, the network device 1924 is a peripheral device, such as a PCI-based device. In these implementations, the network device 1924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1208 may implement NVMe, and the network device 1324 may be connected to a computing system using a PCIe interface.

A PCI-based device may include one or more functions. A "function" describes operations that may be provided by the network device 1924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 18, FIG. 19, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
   accessing, at a network device, a first list of interfaces, wherein the first list of interfaces is a list of interfaces for an equal-cost multi-path group;
   selecting an entry from a plurality of entries from a table stored in memory by identifying an interface set associated with the entry, wherein the entry comprises the first list of interfaces, wherein each entry of the table provides an association between an interface set and a number of interfaces, each interface set represents a list of interfaces for the network device for a given network connection, and the identified interface set comprises a list of interfaces for the network device for a network connection between the network device and a plurality of bricks, each of the plurality of bricks representing a processing domain comprising a plurality of network devices or computer devices;
   determining a size of the equal-cost multi-path group using a number of interfaces associated with the interface set from the entry of the table; and
   allocating hardware resources for the equal-cost multi-path group based on the determined size of the equal-cost multi-path group.

2. The method of claim 1, further comprising:
   creating a bit vector comprising a plurality of bits, each bit of the bit vector representing an interface for the network device; and
   setting respective bit positions in the bit vector corresponding to each of the interfaces from the first list of interfaces, the respective bit positions indicating those interfaces as active interfaces for the equal-cost multi-path group.

3. The method of claim 1, wherein allocating the hardware resources comprises allocating a hardware resource group from a pool of hardware resource groups, wherein the allocated hardware resource group comprises memory for accommodating a number of interfaces for the hardware resource group.

4. The method of claim 2, further comprising:
receiving a reference to an additional interface for the equal-cost multi-path group;
determining that the additional interface for the equal-cost multi-path group will not increase the size of the equal-cost multi-path group beyond the allocated hardware resources; and
setting a bit position in the bit vector corresponding to the additional interface.

5. The method of claim 2, further comprising:
receiving a reference to an additional interface for the equal-cost multi-path group;
determining that the additional interface for the equal-cost multi-path group increases the size of the equal-cost multi-path group beyond the allocated hardware resources;
allocating a new hardware resource group larger than a current hardware resource group;
moving information associated with the equal-cost multi-path group to the new hardware resource group; and
setting a bit position in the bit vector corresponding to the additional interface.

6. The method of claim 5, wherein allocating the new hardware resource group comprises allocating a new memory block, and wherein moving the information comprises transferring the information from a current memory block to the new memory block.

7. The method of claim 2, further comprising:
receiving a reference to an interface belonging to the equal-cost multi-path group for removing the interface from the equal-cost multi-path group;
resetting a bit position in the bit vector corresponding to the reference to the interface;
determining that the reference to the interface is to a last interface in the equal-cost multi-path group; and
releasing a hardware resource group for the equal-cost multi-path group back to a pool of hardware resource groups.

8. A network device comprising:
a memory configured to store a table comprising a plurality of entries, each entry providing an association between an interface set and a number of interfaces, each interface set representing a list of interfaces for the network device for a given network connection; and
processing logic configured to:
access a first list of interfaces, wherein the first list of interfaces is a list of interfaces for an equal-cost multi-path group;
select an entry from the plurality of entries from the table by identifying an interface set associated with the entry comprising all of the interfaces from the first list of interfaces, wherein the identified interface set comprises a list of interfaces for the network device for a network connection between the network device and a plurality of bricks, each of the plurality of bricks representing a processing domain comprising a plurality of network devices or computer devices;
determine a size of the equal-cost multi-path group using a number of interfaces associated with the identified interface set from the entry of the table; and
allocate hardware resources for the equal-cost multi-path group based on the determined size of the equal-cost multi-path group.

9. The network device of claim 8, wherein the processing logic is configured to allocate the hardware resources by allocating a hardware resource group from a pool of hardware resource groups, wherein each hardware resource group comprises memory for accommodating a number of interfaces for the hardware resource group.

10. The network device of claim 8, wherein the identified interface set for the network connection between the network device and the plurality of bricks is a configured interface set with a statically assigned hardware resource group comprising a pre-determined number of interfaces.

11. The network device of claim 8, wherein the processing logic is further configured to:
create a bit vector comprising a plurality of bits, each bit of the bit vector representing an interface for the network device; and
set respective bit positions in the bit vector corresponding to each of the interfaces from the first list of interfaces, the respective bit positions indicating those interfaces as active interfaces for the equal-cost multi-path group.

12. The network device of claim 11, wherein the processing logic is further configured to:
receive a reference to an additional interface for the equal-cost multi-path group;
determine that the additional interface for the equal-cost multi-path group will not increase the size of the equal-cost multi-path group beyond the allocated hardware resources; and
set a bit position in the bit vector corresponding to the additional interface.

13. The network device of claim 11, wherein the processing logic is further configured to:
receive a reference to an additional interface for the equal-cost multi-path group;
determine that the additional interface for the equal-cost multi-path group increases the size of the equal-cost multi-path group beyond the allocated hardware resources;
allocate a new hardware resource group larger than a current hardware resource group;
move information associated with the equal-cost multi-path group to the new hardware resource group; and
set a bit position in the bit vector corresponding to the additional interface.

14. The network device of claim 13, wherein allocating the new hardware resource group comprises allocating a new memory block, and wherein moving the information comprises transferring the information from a current memory block to the new memory block.

15. The network device of claim 11, wherein the processing logic is further configured to:
receive a reference to an interface belonging to the equal-cost multi-path group for removing the interface from the equal-cost multi-path group; and
reset a bit position in the bit vector corresponding to the reference to the interface.

16. The network device of claim 15, wherein the processing logic is further configured to:
determine that the reference to the interface is to a last interface in the equal-cost multi-path group; and
release a hardware resource group for the equal-cost multi-path group back to a pool of hardware resource groups.

17. A network device comprising:
a memory configured to store a table comprising a plurality of entries, each entry providing an association between an interface set and a number of interfaces of the network device, and each interface set representing a list of interfaces for the network device for a given network connection;
resource allocation logic configured to:
   access a first list of interfaces to allocate resources for an equal cost multi-path (ECMP) group, wherein the first list of interfaces is a list other than the list of interfaces represented by the interface sets;
   select an entry from the plurality of entries from the table by identifying an interface set associated with the entry, wherein the entry comprises the first list of interfaces, and the identified interface set comprises a list of interfaces for the network device for a network connection between the network device and a plurality of bricks, each of the plurality of bricks representing a processing domain comprising a plurality of network devices or computer devices;
   determine a size of the ECMP group using a number of interfaces associated with the identified interface set from the entry of the table; and
   allocate hardware resources for the ECMP group based on the determined size of the ECMP group; and
processing logic configured to:
   receive a packet at the network device;
   determine that the packet is addressed to the plurality of bricks;
   identify the ECMP group as a group comprising a plurality of interfaces to route the packet to the plurality of bricks;
   determine an interface from the ECMP group to route the packet to the plurality of bricks; and
   transmit the packet over the interface.

18. The network device of claim 17, wherein the resource allocation logic is configured to allocate the hardware resources by allocating a hardware resource group from a pool of hardware resource groups, wherein each hardware resource group comprises a memory block for accommodating a number of interfaces for the hardware resource group.

19. The network device of claim 17, wherein the resource allocation logic is further configured to:
   create a bit vector comprising a plurality of bits, each bit of the bit vector representing an interface for the network device; and
   set respective bit positions in the bit vector corresponding to each of the interfaces from the first list of interfaces, the respective bit positions indicating those interfaces as active interfaces for the ECMP group.

20. The network device of claim 17, wherein a subset of the plurality of entries comprises interfaces for another network connection between the network device and another brick.

* * * * *

UNITED STATES PATENT AND TRADEMARK OFFICE
CERTIFICATE OF CORRECTION

PATENT NO. : 10,257,080 B1
APPLICATION NO. : 15/169599
DATED : April 9, 2019
INVENTOR(S) : Sravya Kusam and Bijendra Singh Page 1 of 1

It is certified that error appears in the above-identified patent and that said Letters Patent is hereby corrected as shown below:

In the Claims

Column 29, Line 10, Claim 17:
Delete: "an equal cost multi-path (ECMP) group, wherein the"
Insert: --an equal-cost multi-path (ECMP) group, wherein the--

Signed and Sealed this
Sixth Day of August, 2019

Andrei Iancu
*Director of the United States Patent and Trademark Office*